US009110679B1

(12) United States Patent
Chan et al.

(10) Patent No.: US 9,110,679 B1
(45) Date of Patent: *Aug. 18, 2015

(54) PRE-BOOT MANAGEMENT OF DRIVERS AND PROGRAMS

(71) Applicant: Phoenix Technologies Ltd., Milpitas, CA (US)

(72) Inventors: Steven Chan, Fremont, CA (US); Dan Kikinis, Los Altos, CA (US)

(73) Assignee: Phoenix Technologies Ltd., Campbell, CA (US)

(*) Notice: Subject to any disclaimer, the term of this patent is extended or adjusted under 35 U.S.C. 154(b) by 279 days.

This patent is subject to a terminal disclaimer.

(21) Appl. No.: 13/763,986

(22) Filed: Feb. 11, 2013

Related U.S. Application Data

(63) Continuation of application No. 13/486,920, filed on Jun. 1, 2012, now abandoned.

(60) Provisional application No. 61/493,017, filed on Jun. 3, 2011.

(51) Int. Cl.
G06F 9/24 (2006.01)
G06F 15/177 (2006.01)
G06F 9/44 (2006.01)
G06F 21/34 (2013.01)
G06F 21/57 (2013.01)
G06F 9/445 (2006.01)
H04L 12/24 (2006.01)

(52) U.S. Cl.
CPC ............... *G06F 9/4411* (2013.01); *G06F 8/65* (2013.01); *G06F 9/4416* (2013.01); *G06F 9/44505* (2013.01); *G06F 21/34* (2013.01); *G06F 21/572* (2013.01); *G06F 21/575* (2013.01); *H04L 41/082* (2013.01)

(58) Field of Classification Search
CPC ..... G06F 8/65; G06F 9/4413; G06F 9/44505; G06F 21/34; G06F 21/572; G06F 21/575; H04L 41/082
USPC .................................................. 713/1, 2, 100
See application file for complete search history.

(56) References Cited

U.S. PATENT DOCUMENTS

| 5,929,849 A | 7/1999 | Kikinis |
| 6,154,844 A | 11/2000 | Touboul et al. |
| 6,442,623 B1 | 8/2002 | Kim |
| 6,564,318 B1 | 5/2003 | Gharda et al. |

(Continued)

FOREIGN PATENT DOCUMENTS

WO WO 2008/073618 A2 6/2008

*Primary Examiner* — Michael J Brown
(74) *Attorney, Agent, or Firm* — Brokaw Patent Law PC; Christopher J. Brokaw

(57) ABSTRACT

Approaches for managing pre-boot drivers, programs, and data. A BIOS, operating in a pre-boot environment, establishes a connection to a remote server. The BIOS determines whether the server has any updates to be performed to the BIOS using the connection. The BIOS may also perform a discovery process to discover devices operationally connecting to the BIOS and load drivers associated therewith. The BIOS may also establishes a wireless connection to a device, such as a phone, while the BIOS operates in a pre-boot environment. The BIOS may provide, using the connection, the device with access to data stored upon the apparatus, such as picture files, music files, video files, documents, emails, and other media files or objects stored on said device.

30 Claims, 17 Drawing Sheets

(56) References Cited

U.S. PATENT DOCUMENTS

| | | |
|---|---|---|
| 7,778,675 B1 | 8/2010 | Righi |
| 2003/0182245 A1 | 9/2003 | Seo |
| 2004/0205329 A1* | 10/2004 | Wu et al. ........................ 713/2 |
| 2005/0132357 A1 | 6/2005 | Shell et al. |
| 2005/0289289 A1 | 12/2005 | Chang |
| 2006/0010317 A1* | 1/2006 | Lee ................................ 713/2 |
| 2007/0255934 A1 | 11/2007 | Dennis |
| 2009/0319806 A1 | 12/2009 | Smith et al. |
| 2010/0079472 A1 | 4/2010 | Shang et al. |
| 2010/0306773 A1 | 12/2010 | Lee et al. |
| 2012/0143767 A1 | 6/2012 | Abadir |

\* cited by examiner

| Field | Offset | Length |
|---|---|---|
| Handle | 00h | 1 byte |
| Link to next list | 01h | 1 byte |
| VROM List State | 02h | 1 word |
| VROM Type | 04h | 1 word |
| Offset to VROM data | 06h | 1 dword |
| VROM data size | 08h | 1 dword |

Table of VROM List Structure

| |
|---|
| Handle: VROM List Identifier |
| Link to next list: A pointer to a next VROM List |
| VROM list state: Represents the status of a VROM List |
| VROM type: Type of represented VROM data |
| Offset to VROM data: Physical location offset |
| VROM data size: Indicates length of VROM data |

PRE-BOOT MANAGEMENT OF DRIVERS AND PROGRAMS

CLAIM OF PRIORITY AND RELATED APPLICATION DATA

This application is a continuation of, and claims priority to, U.S. Non-Provisional patent application Ser. No. 13/486,920, filed Jun. 1, 2012, invented by Steven Chan et al., entitled "Pre-Boot Management of Drivers and Programs", which claims priority to U.S. Provisional patent application Ser. No. 61/493,017, filed Jun. 3, 2011, invented by Steven Chan et al., entitled "Enhanced System and Method for Pre-boot Management of Drivers and Programs"; the contents of both are hereby incorporated by reference for all purposes as if fully set forth herein.

This application is also related to (a) U.S. Non-Provisional patent application Ser. No. 13/764,396, filed Feb. 11, 2013, invented by Steven Chan et al., entitled "Augmenting a BIOS with New Programs", (b) U.S. Non-Provisional patent application Ser. No. 13/764,364, filed Feb. 11, 2013, invented by Steven Chan et al., entitled "Assessing BIOS Information Prior to Reversion", (c) U.S. Non-Provisional patent application Ser. No. 13/764,313, , U.S. Pat. No. 8,560,820, filed Feb. 11, 2013, issued Oct. 15, 2013, invented by Steven Chan et al., entitled "Pre-Boot Operating Environment", and (d) U.S. Non-Provisional patent application Ser. No. 13/764,087, filed Feb. 11, 2013, invented by Steven Chan et al., entitled "Automated BIOS Enhancements and Upgrades"; the contents of these four patent applications are hereby incorporated by reference for all purposes as if fully set forth herein.

This application is related to U.S. Pat. No. 5,929,849, filed May 2, 1996, invented by Dan Kikinis, entitled "Integration of Dynamic Universal Resource Locators with Television Presentations"; the contents of which are hereby incorporated by reference for all purposes as if fully set forth herein.

This application is related to U.S. Pat. No. 6,564,318 ("the '318 patent"), filed Jun. 18, 1999, invented by Laurent K. Gharda et al, entitled "Method and Apparatus for Execution of an Application during Computer Pre-Boot Operation and Post-Boot under Normal OS Control"; the contents of which are hereby incorporated by reference for all purposes as if fully set forth herein.

FIELD OF THE INVENTION

Embodiments of the invention relate to managing pre-boot drivers, programs, and data.

BACKGROUND

When a computer is powered on, the computer undergoes an initial set of operations to configure the hardware and software of the computer. This process is generally known as the boot process. Various patents over the years have addressed various concerns about the boot process. For example, U.S. Pat. No. 6,564,318 ("the '318 patent") is directed towards an approach concerning the pre-boot environment. The contents of the '318 patent are hereby incorporated by reference for all purposes as if fully set forth herein. Further, a Unified Extensible Firmware Interface (UEFI) standard has been developed by the Unified EFI Forum industry group to enhance the booting process of modern computer systems. However, not all problems in the boot process have been addressed by the UEFI standard and/or known techniques.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 5 is a table illustrating a virtual random access memory (VROM) List structure and an accompanying definition table according to an embodiment of the invention;

DETAILED DESCRIPTION OF THE INVENTION

Figure 1:
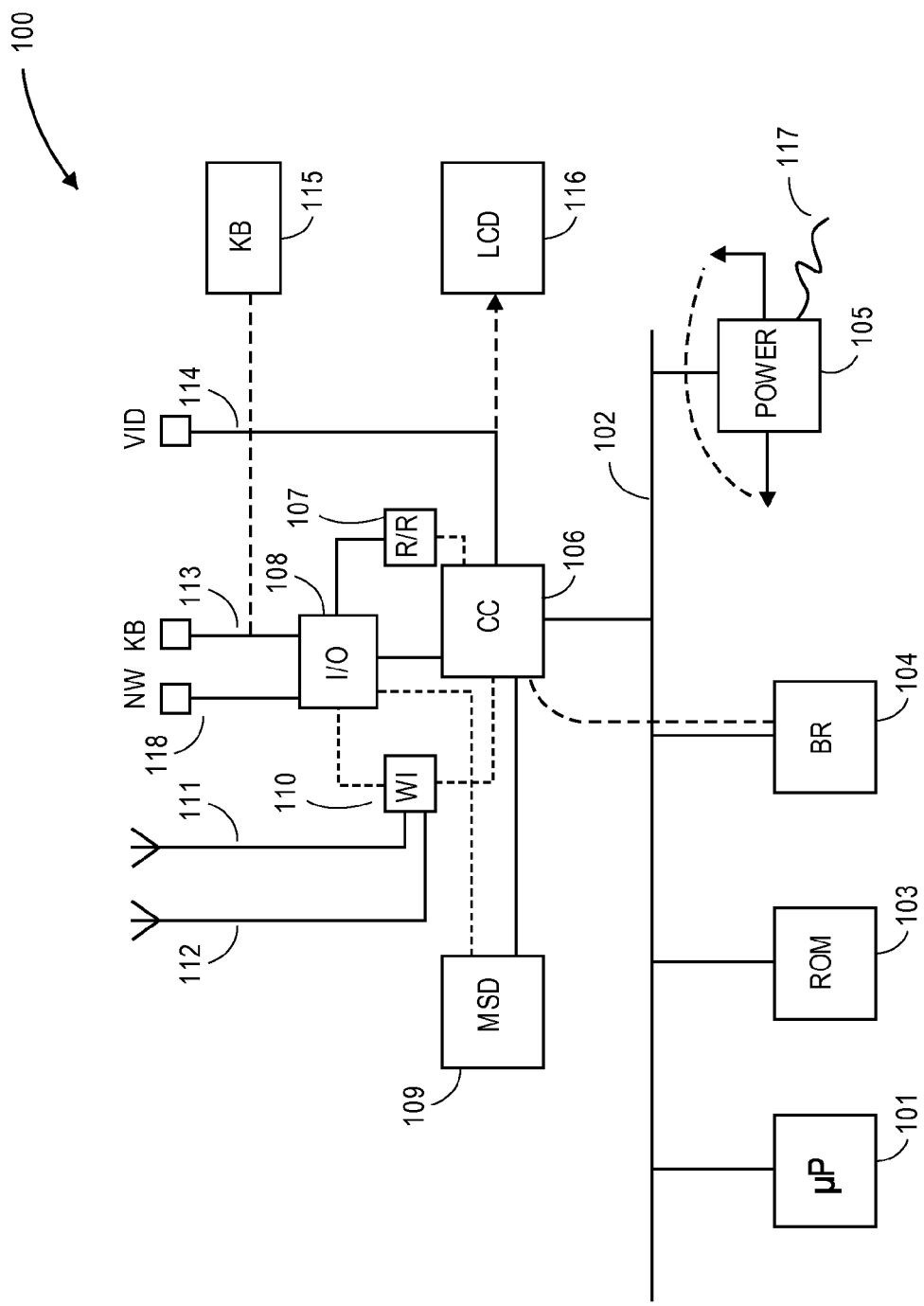
FIG. 1 is a block diagram depicting a system according to an embodiment of the invention.

Approaches for managing pre-boot drivers and programs are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

FUNCTIONAL OVERVIEW

Embodiments provides for a BIOS, operating in a pre-boot environment, to reprogram itself without the use of an operating system bootable disk, as is currently required in almost all cases. In certain embodiments the reprogramming of the BIOS may be performed automatically, i.e., without human intervention or involvement.

Embodiments also provide for a media player, such as described in the '318 patent, which can play full media content in a pre-boot environment within seconds, or even milliseconds, of turning on the system power, much like an embedded special application. Embodiments also simplify pre-boot sequences, such as the activation of hardware, in particular in notebooks, tablets, and such closed systems that preclude or severely limit the number of "add-on" peripheral devices (mostly through USB extensions; in some cases, with an internal mini-PCI or similar slot). Embodiments also provide for an accelerated boot process that stores the last boot configuration and thus can immediately boot the host system by initializing all the required peripherals, without having to first detect them, resulting in a much faster boot, and hence, a faster launching of any media player.

Embodiments also enable flash memory that contains BIOS and other drivers to be reflashed over the air (OTA) using Wi-Fi. A BIOS could have the ability to connect to a server or remote location over Wi-Fi and check the status of the BIOS to determine if a new version is available. This ability could be enabled in the pre-boot stage; it can be used where no OS is currently operating or available to boot from or it can be implemented using a special driver that has a run-time option in the OS. It could be enabled under Windows, Linux, and other desired operating systems. The BIOS may look for BIOS updates in the background while the OS is running, compare any updates the BIOS found to the current existing BIOS, and, subject to user opt-in if so configured, download a file, which may be encrypted, into a hidden partition that is exclusively reserved for the BIOS. The encryption/decryption may be performed by a client contained in the original BIOS. In the OS, this partition can be in the form of a hidden, locked operating system file. The OTA flashing system is scalable and can have worldwide coverage using CDN networks.

Further embodiments also provide a means to cut over with minimum user interface or awareness, preferably in cooperation with the OS. This may happen during pre-boot or non-boot or post-boot during the OS operation by replacing certain procedures used by the OS with procedures available through a driver while the actual BIOS is reflashed. A lock on the OS shutdown can extend the shutdown time, so the flash can be completed. This feature would then essentially work the way OS upgrades do today in the Windows OS, where during shutdown, a message warns that the system is upgrading and the user should not power off or force it off.

Furthermore, embodiments provide a means to reflash or update certain portions of BIOS or flash memory. Instead of a full reflash, a partial reflash can be allowed, for example to add/remove apps. All credentials are re-checked. Further, requiring the use of the unique 128 bit UUIDs and manufacturer information stored in the SMBIOS table, individual PCs can be flashed. Using this approach, "mass" compromise of BIOS in systems can be minimized, since systems have to be compromised individually, not en masse.

Further, embodiments provide for means to reflash or update option ROMs. In some cases, not the whole BIOS needs to be reflashed; rather, only certain updates or application options need to be reflashed, requiring only a partial reflash, rather than a full reflash. Depending on the type of FLASH chip used (e.g., portioned, multi- or two partitions, etc.) and its implementation on a specific motherboard, as new image must be created, since in some cases the whole chip must be reflashed anyway. Additional copies of previous versions may be saved in the secret BIOS file. The file could be, for example, in the range of 50 MB to 100 MB, which is a large multiple of a normal BIOS, but, compared to today's disk sizes typically available, even in "light" operating environments, it's very small.

In a large manufacturing facility, the ability to bulk reflashes BIOS over-the-air is desirable as reflashing last minute BIOS changes in a production environment can be challenging. To be able to do this securely requires a mass reflash feature that can only be used inside a specified factory environment, perhaps tied to a specific server/router with proper access security implemented.

In some cases, rather than using Wi-Fi or BlueTooth wireless, a 3G, 4G or similar connection may be used. Sometimes, the user will be asked for permission. To some cases, the system may connect to a toll free service to be provided by the system manufacturer at no extra charge to the user.

The BIOS with its various components, although some of them typically would not be considered a BIOS or part thereof, should be considered in their totality a BIOS ecosystem.

Embodiments also provide an enhanced pre-boot (PB) environment or PB with downloadable Linux C++ (DLC) as an expanded and enhanced pre-boot phase. That further enhanced PB allows more complete applications to be operated in a PB environment, thus enabling "instant-on" for programs such as IP telephony (for example, but not limited to, Skype) or other desired applications, such as media players, etc. Also, drivers could be made available to use—carrier network, Wi-Fi network, LAN, etc,—as needed for operations Embodiments are support graphics output protocols (GOP) graphics, a novel type of media players, enabling the display of a graphic gallery prior to and during boot. BI0S boot messages could appear in a small window at the bottom of the screen (for example in a picture-in-picture type window or just a status bar), for example, while the rest of the screen could show either static or changing images and or video. In other cases, advertisements, for example, for new and enhanced DLC or BIOS plug-in applications, etc., could be displayed, so the user can click on them and buy them or bookmark them to buy when the system is available to access the store. Where such bookmarks or other purchasing information are gathered, embodiments provide a user or self-controlled method to transfer them over to the booted up OS environment.

Furthermore, embodiments provide security measures enabling the storage of the entire boot memory (or suitable NVM) in memory or on hard drive or other suitable mass storage device (MSD), so the accuracy of the content can be determined before starting to use a new BIOS. In one of the hidden files discussed throughout, a secure, full flash memory copy of the current BIOS may be kept, thus enabling recovery and return to a previous BIOS version, in case the BIOS upgrade is not successful. In addition to the actual BIOS, the file must contain a map of the CMOS information, because the CMOS information may change its use or location from one BIOS version to the next. Thus the mapping must include not just the old version but also the CMOS mapping, with indications of how to recalculate the original values. In some cases, this function can be enabled pre-boot, or non-boot, or post-boot during OS operation before the actual reflashing of the new BIOS.

Further, embodiments provide a means to secure flash information and a flash process to disallow third-party access. Both in the OS and in the BIOS itself, checksum and certificate comparisons occur every time before boot. If the BIOS seems to have been tampered with, i.e., if there are changes that don't match the checksum or certificate, the OS procedure can reflash the BIOS to its original state prior to the tampering.

Further, to detect compromised security and to make security workarounds more difficult, embodiments provide an ability of the BIOS and/or pre-boot environment not just to compare the certificates and start booting, but to recognize compromised security by analyzing traces that such a compromise would create. For example, even if the checksum is correct, the BIOS may compare it with the checksum stored in a secret location in memory or on the disk, and if a modification has not been properly noted, the assumption must be of an unauthorized change that mimics the correct certificate but does not contain the correct certificate. Then the BIOS could revert to the last stored acknowledged copy. This feature could also include comparing the approved registered checksum not just in the storage device in the computer, but also from time to time verifying it with the server and updating it when an approved change is made.

Additionally, embodiments provide the ability to employ an empty space signature to further increase security. Empty spaces can be used by viruses to hide themselves, so the virus-checking program does not find them because the program is not aware of the empty space in the BIOS. Therefore, it is desirable to put a signature pattern into the empty space that can also be checked by the checksum and the certificate and verified along with other content mentioned herein, said content in external storage either on the hard disk or other memory location or on the server. Thus, the program can recognize that an inappropriate load has been added to the BIOS and the system may be compromised, resulting again in a restoration or reversion to the last approved state of the system.

Embodiments also employ hidden network access keys, which can be of great help for improving system behavior. Access and/or ID keys for individual machines can be stored in the BIOS, since these keys can be programmed into the BIOS OTA, thus providing additional protection over keys stored on the hard drive and preventing them from being lost due to drive corruption or crash. Algorithms in the BIOS can be designed to generate those keys so the actual key values are not exposed.

Embodiments provide for a system operating in a pre-boot mode, to enable 3G or 4G or similar kind of modem to gain access to a server to check for updates, other options, securities, drivers, etc. even before the system is configured or in cases where the system can no longer boot because, for example, some driver is missing, has been corrupted, or is otherwise unable to function.

The BIOS may have enhanced abilities to discover peripherals and other devices available in the system, as well as networking devices, etc. This feature may require additional drivers and the ability to expand drivers. Over the course of time, peripherals may be added or removed. A history of peripheral topology, stored in the BIOS, together with their respective driver versions, can help an OEM or third-party service providers maintain individual machines. Further, lot tracking on MRP during motherboard (MB) production enables creation of a database of all released MBs with all actual chips and their respective versions and production lots (of the chips). Such a feature enables a much more granular tracking of faults, driver incompatibilites, etc. Then users could download a correct boot image over a network. The BIOS may, in some cases, check drivers and the registry for matching OS, DLLs, settings for the specific OS, and the actual peripherals installed. Because users sometimes install incorrect drivers and create problems, by self-discovery of the devices that are actually in the motherboard. Because some devices have duplicate VID/PIDs if the way Plug and Play is supposed to discover them is used, the system may install incorrect drivers. This problem can be avoided or remedied by utilizing IDs and manufacturing information, as discussed herein, to identify the actual devices present on the motherboard, and hence to find the correct drivers by using such data available on a server for enhanced discovery of the devices, the installed OS, the installed drivers in the OS, and the settings of those drivers. The BIOS could then recognize that a boot problem may be due to an incorrect driver and/or driver settings; for example, for the boot hard disk, etc. This feature could also include re-creation or recovery of a boot sector. The BIOS could, for example, on the same disk create a physical copy of the master boot record in its hidden file, which copy could be used to regenerate the master boot record, should it be destroyed.

Embodiments provide for management of pre-boot drivers and programs, enabling the system to self-discover and self-heal, ideally without requiring user interaction. Embodiments also supports a pre-boot environment to performs a full Plug 'n' Play (PnP) discovery, find devices that don't currently have a driver, and then download and install the required driver. Additionally, in cases where the OS fails to boot, the pre-boot environment could, for example, scan the OS registry or equivalent and driver pool or equivalent to determine whether the correct drivers are present and properly configured. If a driver is missing or corrupted or is configured incorrectly, the pre-boot environment should be able to replace the incorrect or corrupted driver, or add a correct driver and change or modify the registry or kernel tables accordingly so the system is able to boot in a correct and safe manner. Once a safe mode or minimal boot environment can be established, the OS can take care of itself.

SYSTEM DESCRIPTION

The BIOS with its various constitute and complimentary components, although some of them may not be considered a BIOS or part thereof, should be considered in their totality a BIOS eco-system. FIG. 1 is a block diagram depicting system 100 according to an embodiment of the invention. Included in system 100 are bus 102, microprocessor 101, RAM 103, and non-volatile boot ROM 104, which may be a flash memory device or any other suitable non-volatile memory device. Non-volatile boot ROM 104 may be a flash memory device that is divided into separate sections that may be erased and reprogrammed separately. Non-volatile boot ROM 104 may correspond to a single, large flash device or a page flash device, where each page could be erased and reprogrammed separately.

Further included in system 100 are power supply 105, mass storage unit 109, controller 106, I/O controller 108, real-time clock 107, and wireless interface 110. Note that mass storage unit 109 may or may not be separate from boot ROM 104, Particularly in tablet systems, the mass storage unit may be a separate section within boot ROM 104.

The example of FIG. 1 depicts two antennae 111 and 112; however, more than a dozen different types of wireless LAN and WAN systems could be used. Thus, those in the art shall appreciate that antennae 111 and 112 are merely exemplary of any and all known and reasonably similar future technology, including but not limited Bluetooth. WIFI, Ultra-wideband (UWB), WiMAX, 3G, GFM3G, CDMA, 1XRPT, Edge, 4G, etc., all of which should be considered as capable of being included or otherwise employed by embodiments, thus giving system 100 the maximum latitude to connect to the Internet (not shown).

A video output from controller 106 can go to an LCD display 116. Many embedded system have a video controller embedded in the core controller 106, which controller may comprise one chip or a larger chip set. In some cases, exemplary system 100 may have an additional video output 114.

Also, system 100 may include a built-in keyboard 115 or a keyboard connector 113, or both, and other I/O devices such as, for example, one or more pointing devices, such as a pad, a trackball, a j-mouse, etc., as well as an additional wired network connection 118. External power supply 117 may plug into internal power unit 105.

The architecture of system 100 is only exemplary of certain types of systems, and, depending on the type of system, there may be multiple buses or multiple levels of hierarchical hoses, such as in the X86 architecture or more advanced architecture with a north bridge and a south bridge and three bus levels. However, functionally, they are all more or less equivalent to a flat bus structure, and a hierarchy typically is used only for acceleration. For example, the boot ROM 104 may not connect directly to the main bus 102, but it is always somehow controlled by controller 106. Similarily, mass storage unit 109 may connect in some cases to an I/OA controller 108, or other cases to controller 106, depending on the type and the level and the performance of the interface. Also, in some cases, an external hard disk may be available, connected to an external serial advanced technology attachment (eSATA) port or functionally similar (not shown for purposes of clarity and simplicity only), which is an industry-standard computer bus interface for connecting host bus adapters to mass storage devices, or other connections. Exemplary system 100 can boot without any installed operating system on storage unit 109, which may be a hard drive, flash drive, or any other storage unit with the characteristics of a nonvolatile mass storage unit. System 100 may boot into a pre-boot environment, as described in U.S. Pat No. 6,564,318, which is incorporated by reference in its entirety as if fully set forth herein, or it can it can boot from storage unit 109, if an operating system is installed thereon.

ILLUSTRATIVE FACTORY ENVIRONMENT

Figure 2:
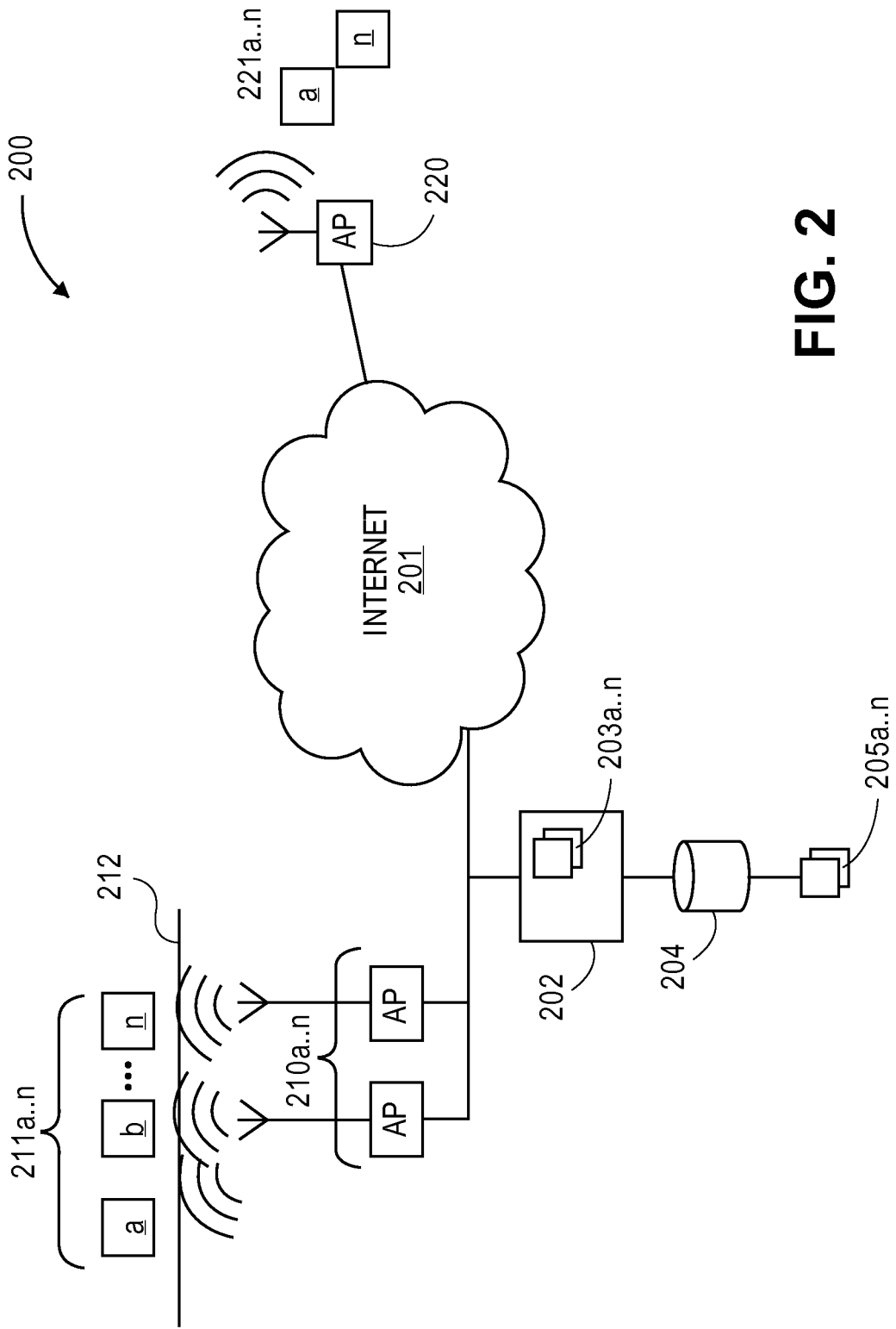
FIG. 2 is a block diagram depicting an exemplary factory environment 200, according to an embodiment of the invention.

FIG. 2 is a block diagram depicting an exemplary factory environment 200 according to an embodiment of the invention. Systems 211a-n, shown in FIG. 2 by exemplary units 211a, 211b, and 211n, are on production line 212. Along production line 212 are access points 210a-n, which connect to factory server 202. Server 202 contains information stored in mass storage unit 204 in the form of data instances 205a-n, such us, for example, look-up tables, etc. Also running on server 202 are software instances 203a-n, of which certain ones enable uploading onto the web, as web content, instances of data 205a-n.

Each unit 211a-n contains a unique ID number (not shown) typically programmed into a parameter section of its nonvolatile boot ROM 104. This unique ID number identifies the configuration of the particular unit, as well as other manufacturing and support-related items, including but not limited to such items as configuration, chipsets and their revisions, etc. One instance 203x of server software 203a-n could thus read the unique ID number, look up the configuration of the host system from a look-up table 205x, and identify the correct BIOS for each system.

In some cases, in addition to the unique ID number, a system 211a-n may have the ability to create its own configuration table for user-added devices, either within the BIOS or boot program (used interchangeably herein) and or in conjunction with the operating, system and/or an application running on the operating system. When such a system connects through a network, as, in this example, through access points 210a-n, the system can immediately connect to server 202 and download an updated version of the BIOS. The approach described above permits the installation of a preprogrammed ROM during manufacturing that contains a basic, simple BIOS, and then, when the units are powered on, they can automatically download and install an updated BIOS. Further, any time during their lives, these systems can download and install a BIOS update from an external point, as long as they can connect. For example, systems 221a-n connect to access point 220, which could be any public or private access point, and thence via Internet 201 to server 202. In some cases, access points may be connected directly or through a gateway to the Internet. An access point provides access for a Local Area Network (LAN) type wireless network to a wired LAN and/or to a wired or wireless Internet connection.

MASS STORAGE DEVICE PARTITIONS

Figure 3:
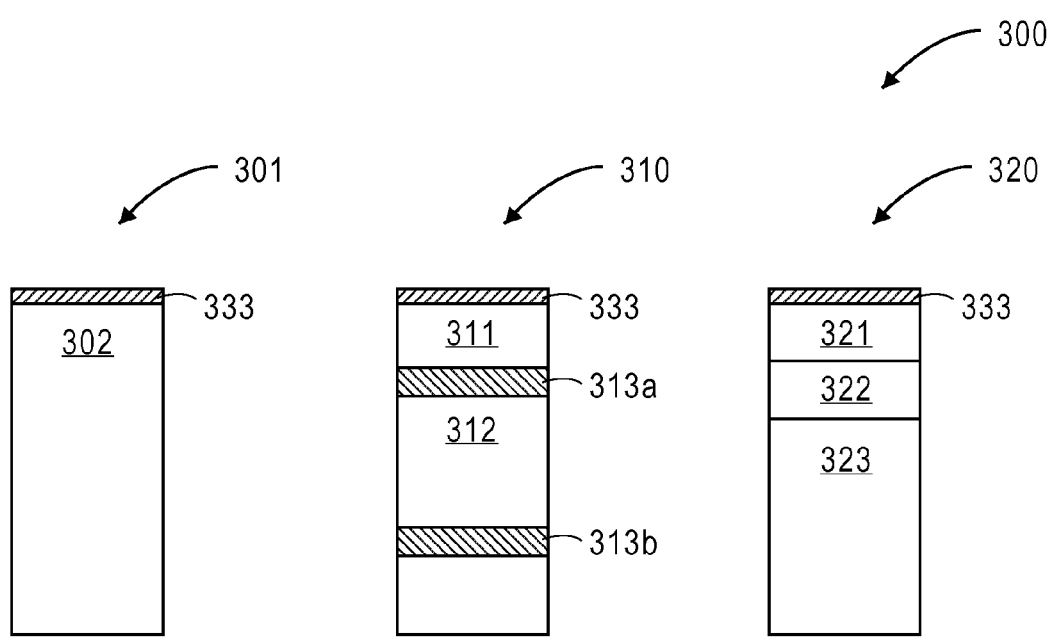
FIG. 3 is an illustration of a set a of examples involving partitioning mass storage device (MSD) and how the BIOS/boot program-related items and programs may be stored therein according to an embodiment.

FIG. 3 is an illustration of a set 300 of examples involving partitioning mass storage device (MSD) 109 and how the BIOS/boot program-related items and programs may be stored therein according to an embodiment. Example 301 shows a typical approach of partitioning a master boot record 333 and one storage unit 302.

Example 310 involves a master boot record 333, a secure boot partition 311, and a standard data storage partition 312, contained in which are additional header information 313a and an additional embedded file 313b. File 313b may be used to store the data for the pre-boot environment. File 313b may be from normal user access as a system file, thereby offering it a level of protection. File 313b may be located in a predetermined specific section of the mass storage unit so that file 313b is easy to locate. A simple file system may be embedded within hidden file 313b, which may function as an operating system in the pre-boot environment.

Example 320 involves a master boot record 333, a secure boot partition 321, main storage unit 323, and a separate partition 322 for the BIOS use. Partition 322 is used only in the pre-boot environment and may be inaccessible, or difficult to access, from the normal operating system. Some tools may need to access partition 322 during normal operating system or post-boot operations, but partition 322 may be secured from all but an authorized super user.

INSTALLING A BIOS UPDATE

Figure 4:
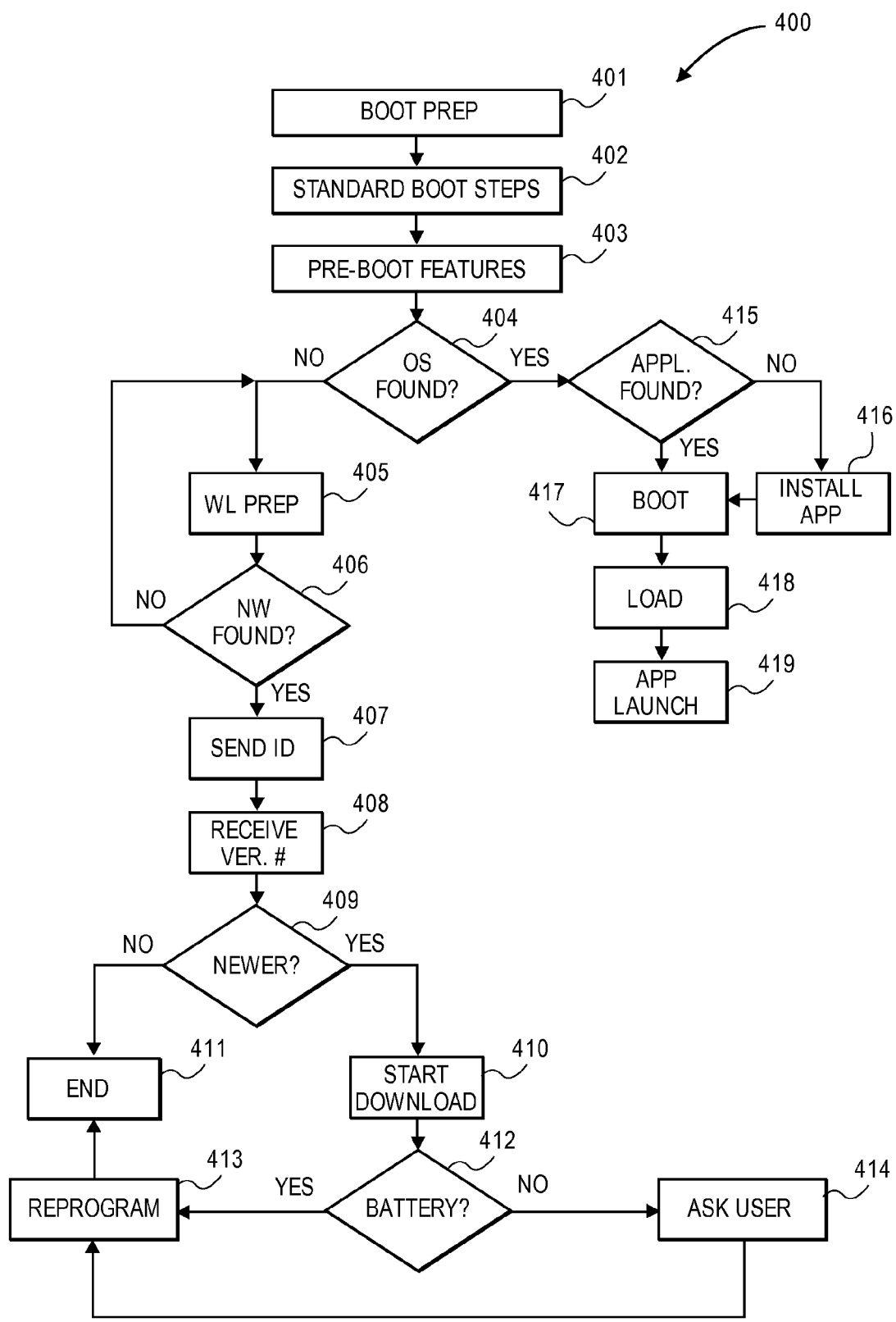
FIG. 4 is a flowchart illustrating an exemplary process for downloading a BIOS update without booting the operating system according to an embodiment of the invention.

FIG. 4 is a flowchart illustrating process 400 for downloading a BIOS update without booting the operating system according to an embodiment of the invention. Process 400 may be performed in conjunction with a Pre-boot Application Manager (PAM) described further below. In an embodiment, a PAM is a BIOS extension module configured to locate, initialize, and execute certain applications, including, in some cases, for example, BIOS upgrade. In other embodiments, the PAM may check the not-yet-booted operating system (OS) for correctness of drivers matching the present hardware, etc., as well as correct bootable configuration of the drivers and such, thereby ensuring a smooth boot capability of the operating system.

In step 401, the boot preparation routine activates all the host machine hardware.

In step 402, all the chips are initialized as in a standard boot preparation. The system can read the list of chips from a short table, so the software need not do a full system hardware discovery, but rather, relies on the last known operational state. Discoveries of new devices can be left to the operating system to make updates tor the next boot.

In step 403, any necessary pre-boot features are enabled.

In step 404, the system cheeks to determine whether an operating system is present. If no operating system is present (no), then the process moves to step 405, where the system prepares to launch a wireless communication shell.

In step 406, the system does not find a connection to a wireless network (no), then the process waits a certain period and then loops back to step 405 to try again. Although not shown, after a certain number of attempts, the system may be configured to shut down, return an error message to the user, or return a request to plug the host machine into a wired network.

In step 407, after the host machine connects to a network (yes), then the system sends an ID to a specific server, as described above in the discussion of FIG. 2.

In step 408, the server sends back a verification number, which is similar to a certificate, while also informing whether a newer BIOS version is available or not.

In step 409, if no newer version is available, (no), then the process ends at step 411.

If, in step 409, a newer BIOS version available (yes), then in step 410, the system starts to download the newer version to the host machine.

In step 412, the system checks the power availability of the host machine, to determine if the machine is AC powered or if the battery is sufficiently charged with a sufficient minimum, such as, for example, 50 to 70 percent The system may make an additional check in some cases as the battery may provide an inaccurate charge reading immediately after boot; after one or two minutes, the battery reading is more accurate.

If the system is deemed to have sufficient power (yes), then the process moves to step 413, where the BIOS is reprogrammed into the boot ROM, and then the process ends at step 411.

If, in step 412, the battery does not have sufficient charge to complete the process (no), then the system moves to step 414, where it may send a message asking a user to plug the machine into AC power or connect it to a charger and leave the charger connected during reprogramming.

If, in step 404, an operating system is found (yes), then the process moves to step 415, where the system cheeks the operating system partition for the presence of a post-boot application (PBA) that can manage a BIOS update while the operating system is running.

If no such application is found (no), then the system moves to step 416, where the system installs such a post-boot application into the operating system from a reserved partition, such as 313a, 313b, or 322, as described earlier in the discussion of FIG. 3.

The process then moves to step 417, as it does from step 415 if an application is found (yes), where the operating system boots. The operating system loads in step 418, and in step 419, after the operating system boot, the application automatically launches. The process then moves to step 407, and moves through the subsequent step described above.

Note that step 413 may be delayed until the user assents in response to a prompt, as this step may require a reboot of the host machine. Alternatively, the process may pause, after the download in step 410, until the next time the host machine boots, when it would continue with the reprogramming. In some cases, the download may be interrupted, so on the next boot, between steps 404 and 405, the system may execute a test to determine whether the updated BIOS downloaded completely. Depending on the outcome of such a test, system may connect to the network and finish or repeat the download, or it may skip connecting to the network and go to step 413, if the download was found to be complete, and then reboot.

Some or all of the steps described above may be activated only, for example, after a user opt-in; whereas in the factory, the auto-update may initially be active, allowing the system to be upgraded until final shipping in an easy manner. Typically, a user would be queried if an upgrade should be made, unless at least 50-70 percent of battery is available. Further, in some cases, a reflash may be done while the operating system is operational, for example, by using the PBA to temporarily provide services in lieu of the BIOS. In other cases, the operating system may be "frozen," using a sleep mode, etc., and then transposing any variables as needed (such variables typically may be stored in a section of the RTC CMOS memory). In some cases, the reflash is launched as part of a shutdown sequence, much as normal installations and operating system upgrades do. It then transposes the variables and reboots the system later.

Also, in addition to checking for an updated BIOS, the PAM may check, in conjunction with the PBA or by itself, for correct drivers, etc., after a user opt-in. Because the operating system typically is shipped in a "virgin" mode, meaning no user is installed or activated in the operating system, the ability to load additional drivers into the image using the PAM is very valuable, as the PBA cannot be activated in most operating systems in use today. Once a user account is present, further automatic updates may be suspended, pending user consent. Further, in addition to the PAM downloading new BIOS images as described above, but the PAM may also download newer versions of a PBA, as well as other support files, including but not limited to drivers and the like.

VROM LIST STRUCTURE

FIG. 5 is a table illustrating a virtual random access memory (VROM) List structure and an accompanying definition table according to an embodiment of the invention, it is anticipated that the list structure and accompanying definitions depicted in FIG. 5 to be self-explanatory to those of ordinary skill in the art.

The VROM List of FIG. 5 informs the calling software application information about where data is stored, how large each data block is, the type of data (such as VGA), and so forth. Such data will change to reflect the current status after an installation and/or deletion of a program. A mechanism (not shown) is also provided to offer a set of instructions in the event of a return error that indicates a problem with an installation. For example, a protection mechanism may restore previous settings by using a mirroring technique (known in the art) so that a backup or default installation may take priority.

It will be apparent to those of ordinary skill in the art that there are a variety of alterations that might be made to the embodiments described herin without departing from the spirit and scope of the teachings herin. Some of the variations have already been discussed, such as the use of other non-volatile storage devices other than a flash ROM, and differing sizes of storage devices. It is well known that programmers have individualistic ways to structure code, and many variable code structures may accomplish similar ends. Similarly there are many sorts of plug-ins that may be accomplished to a VROM BIOS according to embodiments. Some may accomplish pre-boot functions and others may accomplish post-boot BIOS-enabled functions. Among the many possibilities are disk utility programs, virus protection programs, PC card scanning programs, specific device BIOS code, and the like.

PRE-BOOT APPLICATION MANAGER (PAM)

In an embodiment, a BIOS extension module is provided and adapted to locate, initialize, and execute certain applications, including multimedia applications in some cases, from stored location on a hard drive or other connected mass-storage-device (MSD) before normal booting of the operating system. The extension module, termed a pre-boot application-manager (PAM), may be provided as part of a normal BIOS, or as part of a V-ROM BIOS described in the '318 patent.

In a preferred approach, a V-ROM BIOS is used because of versatile flash-in capabilities inherent to the device. A PAM is a software module installed or flashed in as an extension to a system BIOS such as a V-ROM BIOS. A PAM module in this example comprises separate parts that take up residence in specific areas of V-ROM-BIOS. For example, a NVM part of PAM is resident in non-volatile-memory (NVM) and is loaded and executed by V-ROM. A post-boot part of PAM is implemented for accessing or setting up new MSDs, finds required driver information (location and type), and binds that information into a third part or file-sytem-structure (FSS) module, which then becomes a part of NVM resident code. One of ordinary skill in the art shall appreciate that the functional implimentation of a PAM into a BIOS chip, whether flashed in, or pre-installed, will follow BIOS convention during execution such as compression, shadowing, and addressing techniques that have already been described in the '318 patent. Therefore, the inventors deem that the process steps described below will be sufficient for explaining, the approaches disclosed herein in an enabling manner.

Figure 6:
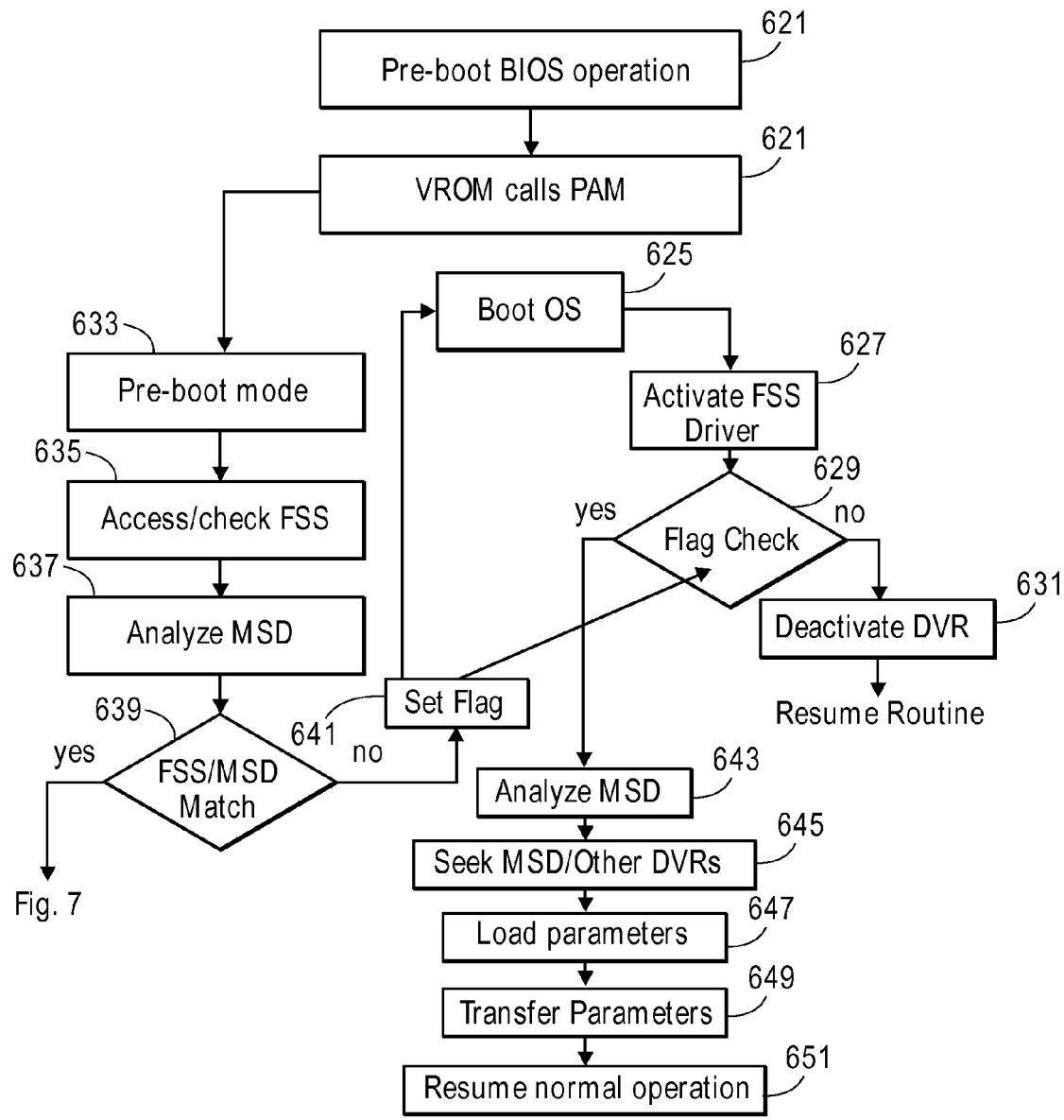
FIG. 6 is a flowchart illustrating the steps for V-ROM execution of a PAM according to an embodiment of the invention.

FIG 6. is a flowchart illustrating the steps for V-ROM execution of a PAM according to an embodiment of the invention. The example of FIG. 6 assumes that a flashable V-ROM chip is installed and operable.

In step 621, pre-boot BIOS operation begins.

In step 623, V-ROM calls and executes a PAM module.

Step 633 represents a pre-boot mode during which time PAM begins operation.

At step 635, PAM accesses and scans its FSS module for valid MSD information such as type, size, operational system (OS) parameters, and so on. If MSD information pointers are available, indicating that a device is recognized, then the designated MSD is analyzed in step 637. This step confirms parameters for a match such as type (SCSI,IDE),size,(capacity, available memory), format (number of boot partitions, type of OS), and so on.

At step 639, PAM determines if a match has been made. If yes, the process resumes with steps illustrated in FIG. 7, step 740. However, if there is no match, then it is assumed that the system has been modified (given different instruction) or the MSD is a new device and has to he re-set. Assuming for purpose of description that the system is being booted for the first time after flash-in, or that a new default MSD is being added, there would be no match in step 639. At this juncture, PAM sets a flag (step 641) which may be a simple binary code so that new parameters associated with the new MSD may be loaded into BIOS for the next boot operation. Such parameters may include any required information including but not limited to driver location and identification for accessing and launching any pre-boot applications such as videos, static ads, audio ads, or other pre-boot informative displays. The process then proceeds as illustrated via directional arrow back to step 625 to boot the operating system.

After operating system booting is initiated in step 625, an FSS driver having the capability of accessing and analyzing a connected MSD is activated in step 627, along with other system drivers.

At step 629, the driver checks for the pre-set flag set in step 641.

If the flag is found (which means that there is currently no valid MSD installed), then the process proceeds to step 643 where the new MSD is analyzed.

At step 645, the parameters associated with MSD drivers and other drivers that are generic to pre-boot applications intended to be executed during pre-boot operations are located on the MSD.

At step 647, such parameters are loaded and prepared for transfer into the FSS module of step 635.

After completion of transfer of parameters from the MSD into the FSS module at step 649, normal system operation, including complete booting of the operating system, resumes in step 651.

The next time that the system is powered on, the new changes are recognized during pre-boot analysis and any loaded ads, including multimedia ads, will he accessed and displayed automatically, after which the operating system will be booted.

If, however, no flag is set in step 641, then there will be no flag found in step 629, and the process will continue to step 631, where the unique driver that is part of the BIOS, and is used in the VROM-DVR, is deactivated. This assumes that required information was already accessed, loaded and matched in step 639 during a previous boot event. If so, then the process proceeds to FIG. 7, as previously described.

Figure 7:
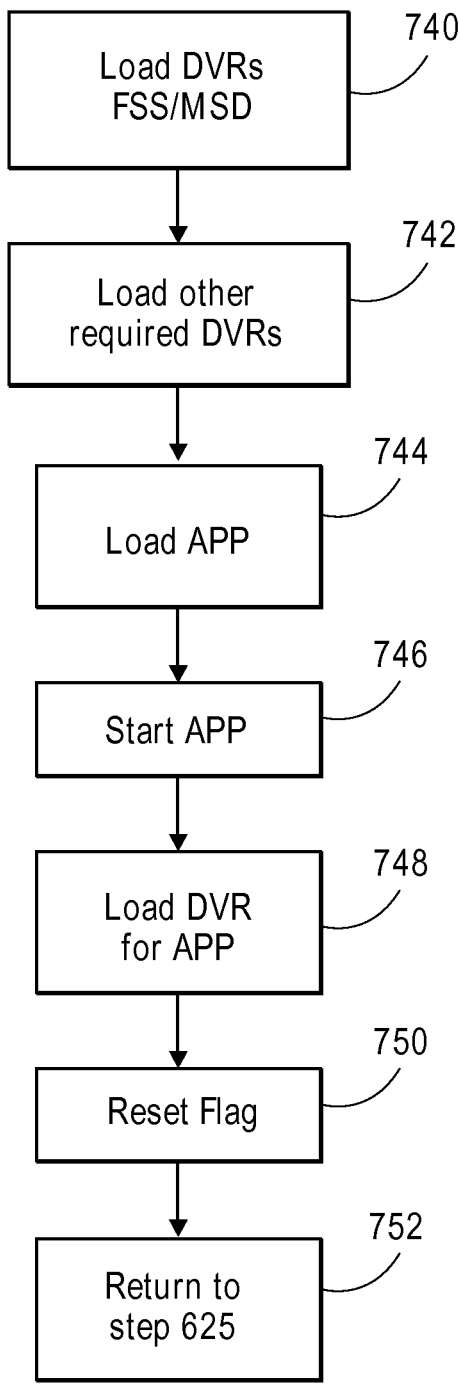
FIG. 7 is a flowchart depending from the flowchart of FIG. 6 that depicts an application loading sequence according to an embodiment of the invention.

FIG. 7 is a flowchart depending from the flowchart of FIG. 6 that depicts an application loading sequence according to an embodiment of the invention. FIG. 7 illustrates the loading sequence for accessing an MSD and displaying such as advertisements according to matched information contained in the FSS module of step 639 (FIG. 6).

In step 740, the FSS module accesses and loads MSD drivers into NVM.

In step 742 any application drivers are similarly loaded.

At step 744, any targeted application programs (e.g., ads) are loaded from the MSD.

The loaded application(s) are then executed in step 746.

The application's driver is then executed in step 748 in a manner consistent with normal execution under a fully loaded operating system. The application(s) are displayed during the time from power-on to OS-load (pre-boot and possibly during-boot).

A new flag is then set at step 750 which will point to any new additions or changes to the pre-boot advertisements for the next boot-up.

The process flow sequence as taught above in FIGS. 6 and 7 is meant to he exemplary of one such process that could be implemented in practice of the embodiments disclosed herein. There are many variations that may be included without parting from the spirit and scope of the system and method disclosed herein. In one example, an ad schedule may be downloaded from a switched packet network to an MSD. The ad schedule may include several individual ads, including but not limited to ads such as, perhaps, MPEG or other suitable format video clips, where one or more clips will be played per pre-boot event in serial order (rotated). An FSS driver capable of disseminating the ad schedule, and identifying the appropriate ad and application driver will set a new flag for the next ad after playing the previous ad. In this way, the next time the system is powered on, the new ad will be loaded and played, As another example, an application is provided as part of PAM software that resides on a connected MSD and can communicate with counterpart software in system BIOS. In this example, any new ads of any media type may be selected by a user and flashed into BIOS at any time during normal operation. Similarly, such ads and driver information may be flashed into BIOS by a third party utilizing a connected network server adapted for the purpose. After the system is powered on, the new pointers are registered and retained into system BIOS (FSS module). These pointers may indicate, in some cases, a new or alternately selected MSD device which the ads reside.

In another example, an FSS module may be segmented to contain separate blocks of information pertaining to more than one MSD having separate ads resident thereon. This variation may reflect a number of individual video-display-units (VDUs) networked together and having minimal and individual MSD capability. A main booting station and MSD connected to the network of VDU's may provide BIOS initialization for each connected unit. In this example, pre-boot ads or instruction may he personalized to individuals assigned such VDUs.

It is clear that many modifications and variations of the system and method disclosed herein may be made by one skilled in the art without departing from the spirit of the novel art of this disclosure. For example, BIOS for helping boot up a system may reside in a non-volatile memory, which BIOS has the ability to execute certain programs before booting an operating system, and these programs are able to connect to a server maintaining a database relevant to versions of the BIOS. Further, in some cases the BIOS could download a newer version of BIOS code, and the BIOS could then reprogram the non-volatile memory to use the newer code for the BIOS following the reprogramming. Further, a server may contain a program for automatic BIOS updates and a storage with at least one newer version of a BIOS, with the server responsive to inquiry by a system containing a BIOS, where such an interaction can be made without requiring an operating system present in the system. Additionally, the BIOS eco-system may contain code allowing the reprogramming to be made without requiring user interaction on the system or a reboot of the system. In some cases, the BIOS may contain code to connect over wireless communication when available, and thus connect to the server. Also, the BIOS may store the older version in a secure file in non-volatile memory, allowing the user to revert to a previous version in cases where needed or desired.

LAUNCHING APPLICATIONS IN A PRE-BOOT ENVIRONMENT

Figure 8:
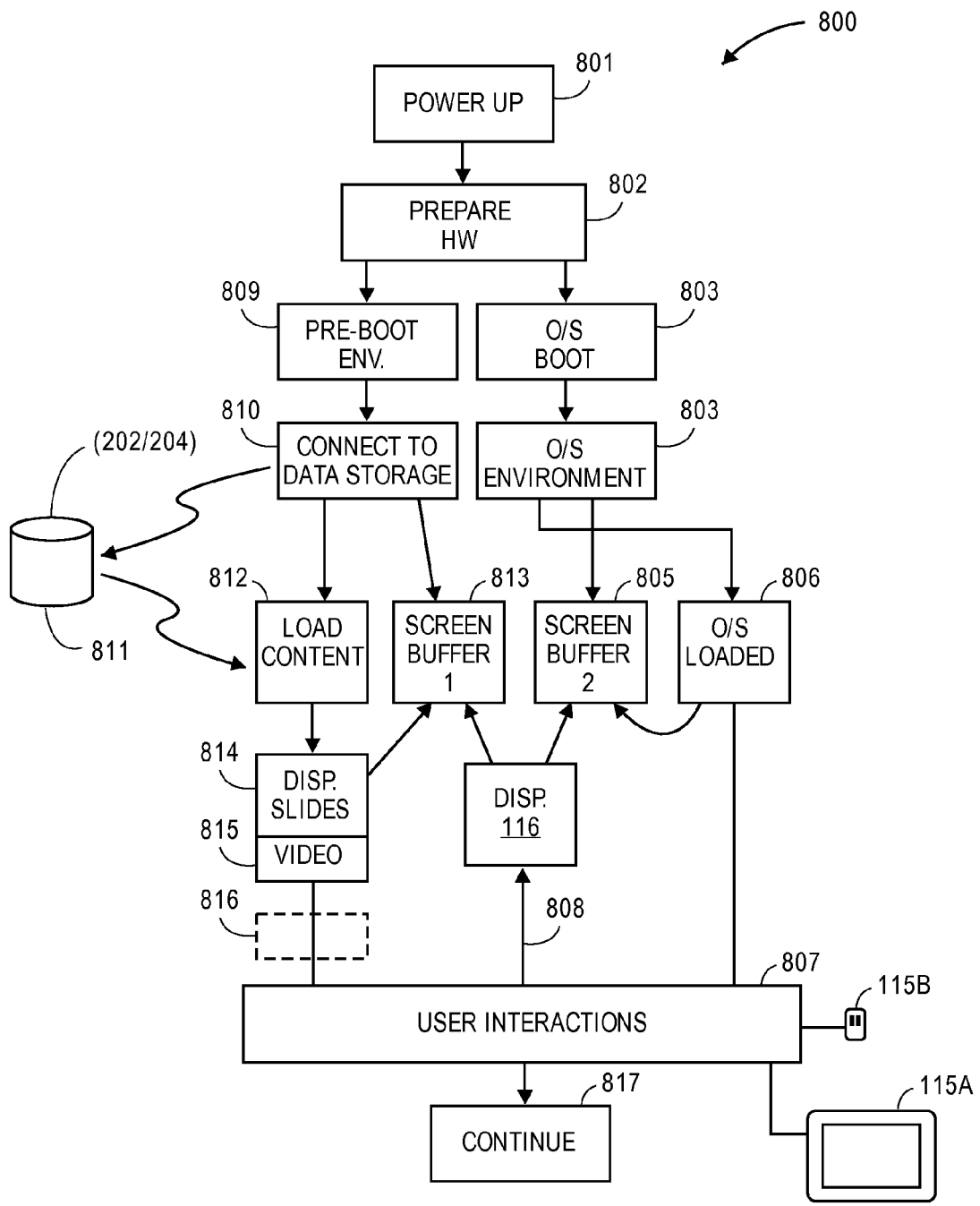
FIG. 8 is a flowchart illustrating process for an enhanced pre-boot sequence according to an embodiment of the invention.

FIG. 8 is a flowchart illustrating process 800 for an enhanced pre-boot sequence according to an embodiment of the invention. After a computer is powered on in step 801, the pre-boot sequence may, in step 802, branch into two different threads. These two different and in some cases co-temporal threads could be software threads single core processors or separate core threads for multi-core processors, which are currently inexpensive and widely used, often even in more portable computing devices such as smart phones, tablets, etc.

In step 803, the operating system (OS) boots.

In step 804, the pre-boot sequence boots the OS, which establishes the operating environment. The pre-boot sequence also sets up a screen buffer for the OS. An illustrative screen buffer is identified in FIG. 8 as "screen buffer 2" 805.

In an embodiment, "screen buffer 2" 805 is used to support the visual outputs of the OS. However, the contents of "screen buffer 2" 805 may or may not appear on display 116. The determination of which particular screen buffer (for example, "screen buffer 2" 805 or "screen buffer 1" 813, described below) contents displayed on the screen (for example display 116) is controlled by a selection 808 made in use interaction 807. In some cases, the display may visually depict the contents of "screen buffer 2" 805; in other cases, the display may visually depict the contents of "screen buffer 1" 813.

In step 806, the loaded OS interacts with "screen buffer 2" 805. In step 806 the OS may also receive user interaction 807. In some cases the BIOS and/or the keyboard controller may intercept special key codes that let the user switch between the screen buffers 805 and 813; in other cases, the system may have special keys or key combinations for this function.

Returning to step 802, if the process moves to step 809, then in step 809 the BIOS sets up a pre-boot environment. An embedded Linux-style operating system as pre-boot environment would be desirable, but it is not a requirement; any other suitable OS or rudimentary operating environment may suffice as long as it can support the uses as described herein. For example, in a minimal implementation, a media player and a few required drivers for hardware are loaded, without providing a full pre-boot environment or OS.

In an embodiment, the pre-boot environment may include an email client or an email server. Adding in some cases an email client could allow emails to be read without requiring the main OS to be booted. In some other cases, an email server could be added as well, that could allow an external client, for example a mobile phone networked to the system, to review, edit and respond to messages, without connecting to the internet at large. This would for example allow a user to quickly review a few emails previously downloaded into the computer, without having to unpack or boot the system. In yet some other cases, the server could use the connection to the phone to periodically connect via the phone to the internet, and thus download emails, or retrieve emails previously downloaded to the phone into the notebook. Once the user turns on the notebook, those emails can be instantaneously retrieved into a mail client running on the main operating system, for example by adding an alias mail account or by operating as a mail proxy server. In some cases, those emails may be stored as files on a non-volatile mass storage device, in other cases they may be objects embedded into a data structure, but may be made accessible to external clients. This can be extended to other file and object types, including but not limited to emails, messages, pictures, music, video etc.

In step 810, the pre-boot environment connects to data storage 811, which could be, for example, a local hard disk, a local mass storage device, a non-volatile storage device, or an actual server and hard disk somewhere on the network.

In step 812, updated pre-boot content is loaded from a server, or in some cases, from a local non-volatile memory (NVM), where it may have been deposited daring a previous usage.

In step 814, slides may be optionally loaded and in step 815 one or more videos may be optionally loaded. Steps 814 and 815 may be used to present some type a multimedia presentation with sound, slides and video on "screen buffer 1" 813 for display during boot, for example. These images, slides, video, etc, may adhere to one or more of many standards, but should as well support graphics output protocols (GOP). The user has the ability interact with the presentations of steps 814 and 815, as described above. Additional programs may be available as indicated by dotted box 816, which programs may support such functions as internet telephony, video-on-demand, downloading. etc.

Controls in user interactions 807 enable the user to choose to interact with either the left-hand process thread (steps 809 and onward) or the right-hand process thread (steps 803 and onward), switching the display 116, keyboard, and mouse focus as desired. As described above, this switching could be executed by a key combination, special key, or other user input means. When the user decides to leave this special environment, he can make a transition in step 817 either to a full pre-boot environment or to a full OS environment Further, in some cases, an application in the pre-boot environment can launch a matching application to the OS environment, set up said application identically, and transfer control to said application seamlessly. For example, an IP voice call could be started under the pre-boot DLC. Then in the OS, the same IP voice call app is launched, logged in, and the call transferred, allowing seamless use. Such a feature may require, in addition to mapping pre-boot environment apps to OS apps, a "pipe" between the two environments to transfer program data, etc. from one application to another. In some cases a local IP pipe may be established, in other cases a temporary file on as commonly accessible storage may be used, such as the MSD.

Further, in some instances, a local IP router may be used under the pre-boot environment, allowing both the OS and the pre-boot environment to share a single local area network IP address, by providing a system internal virtual LAN with network address translation (NAT).

It is clear that many modifications and variations of the system and method disclosed herein may be made by one skilled in the art without departing from the spirit of the novel art of this disclosure. For example, BIOS for helping boot up a system may reside in a non-volatile memory, The BIOS has the ability to execute certain programs before booting an operating system, and these programs are able to connect to a server maintaining a database relevant to versions of the BIOS. Further, in some cases the BIOS could download a newer version of BIOS code, and the BIOS could then reprogram the non-volatile memory to use the newer code for the BIOS following the reprogramming. Further, a server may contain a program for automatic BIOS updates and a storage with at least one newer version of a BIOS, with the server responsive to inquiry by a system containing a BIOS, where such an interaction can be made without requiring an operating system present in the system.

Additionally, the BIOS eco-system may contain code allowing the reprogramming to be made without requiring user interaction on the system or a reboot of the system. In some cases, the BIOS may contain code to connect over wireless communication when available, and thus connect to the server. Also, the BIOS may store the older version in a secure file in non-volatile memory, thereby allowing the user to revert to a previous version in cases when needed or desired.

Other embodiments may include a system with a BIOS for helping boot up a system. The BIOS may reside it a non-volatile memory and may have the ability to execute certain programs before booting an operating system. These programs may be able to launch as pre-boot operating environment. In some eases, this pre-boot operating environment may be a Linux-style operating system in which downloaded Linux C programs may be executed.

Further, this pre-boot operating environment may allow an "instant-on" feature for programs to be executed. In some cases, the programs may include IP telephony or media players, while in other cases, they may include graphics output protocols players. Additionally, in some cases, traditional BIOS boot messages may appear in a small window at the periphery of screen, allowing the majority to he used for these programs. In such cases, the user may indicate interest in an item and bookmark the item for later use, including, for example, purchasing or licensing the item.

ASSESSING BIOS INFORMATION PRIOR TO REVERSION

In an embodiment, checksum and certificate comparisons against the BIOS and the OS occur each time a device is booted. Note that in certain embodiments, on one of the BIOS and the OS may be analyzed in this fashion. If the current version of the BIOS does not match the checksum and certificate, then the BIOS will he deemed to have been tampered with. As a result, the OS can re-flash the BIOS to its original state prior to the tampering.

For every security solution, there is a work-around. Thus, embodiments identify compromised security by analyzing traces that a security violation would create. For example, even if the computed checksum for the BIOS is correct, the BIOS would compare itself with a checksum stored in a secret location in memory or on the disk, and if a modification has not been properly noted, then an unauthorized change that mimics the correct certificate but does not contain the correct certificate is deemed to have occurred. Thereafter, the BIOS would revert to the most previous stored copy that was deemed to be safe or valid.

Embodiments may also, at periodic and/or configurable intervals, verify the approved registered checksum with a server and/or update the approved registered checksum when an approved change is made to the approved registered checksum. In some embodiments, the approved registered checksum may not be stored locally, but instead, be stored on the server or at another remote (and presumably secure) location. To further enhance security, an additional verification (possibly involving keys or certificates) may be used to update the approved registered checksum stored on the server.

Empty spaces can be used by certain viruses to hide themselves. In this context "empty space" refers to the fact that this space is not used for the BIOS or pre-boot environment, hence empty of useable code and data. Any occurrence of code and data within an area deemed "empty space" therefore is suspect and cause for possible alarm.

Virus checking programs may not find a virus in the empty space because the virus checking programs may not be aware of the empty space within the BIOS. Therefore, it is desirable to put a signature pattern into the empty space that can be (a) checked by the checksum and the certificate and (b) verified with an external storage either on the hard disk or other memory location or on the server. In this way, the virus checking program can recognize that an "inappropriate" load has been added to the BIOS and the system may be compromised, which may cause the system to perform a restoration or reversion to the last approved state of the system.

Figure 9:
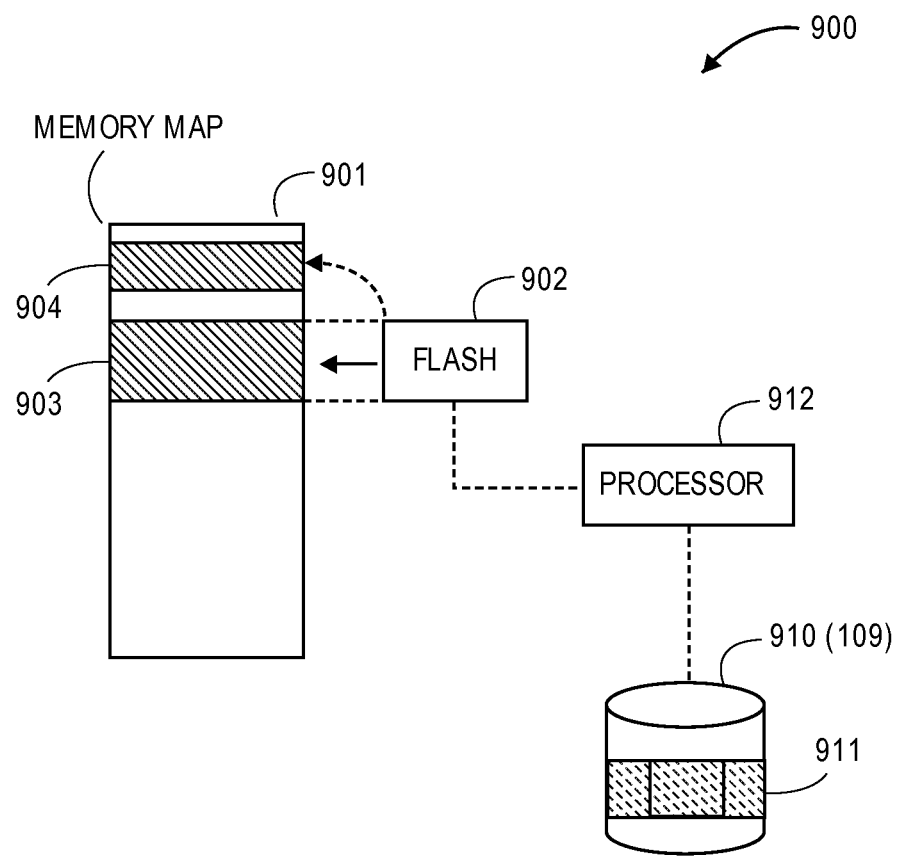
FIG. 9 is a illustration of exemplary memory and file mapping process according to an embodiment of the invention.

FIG. 9 is an illustration 900 of exemplary memory and mapping process 900 according to an embodiment of the invention. Illustration 900 depicts memory map 901. One of the BIOS procedures stored in section 902 copies boot code from flash memory into a section of RAM 903 and then installs the boot code separately as runtime section 904. While section 902 is indicated as being implemented on Flash memory in FIG. 9, section 902 may be implemented using other suitable mediums, such as a suitable boot ROM or NVM.

The dotted lines in FIG. 9 indicate the involvement of processor 912 in the execution of actions performed by various software or firmware instances and/or procedures.

Mass storage device 910, or any other similarly suitable device, contains a locked file 911. Locked file 911 contains a complete secure copy of the boot environment, flash memory content, and the like.

Figure 10:
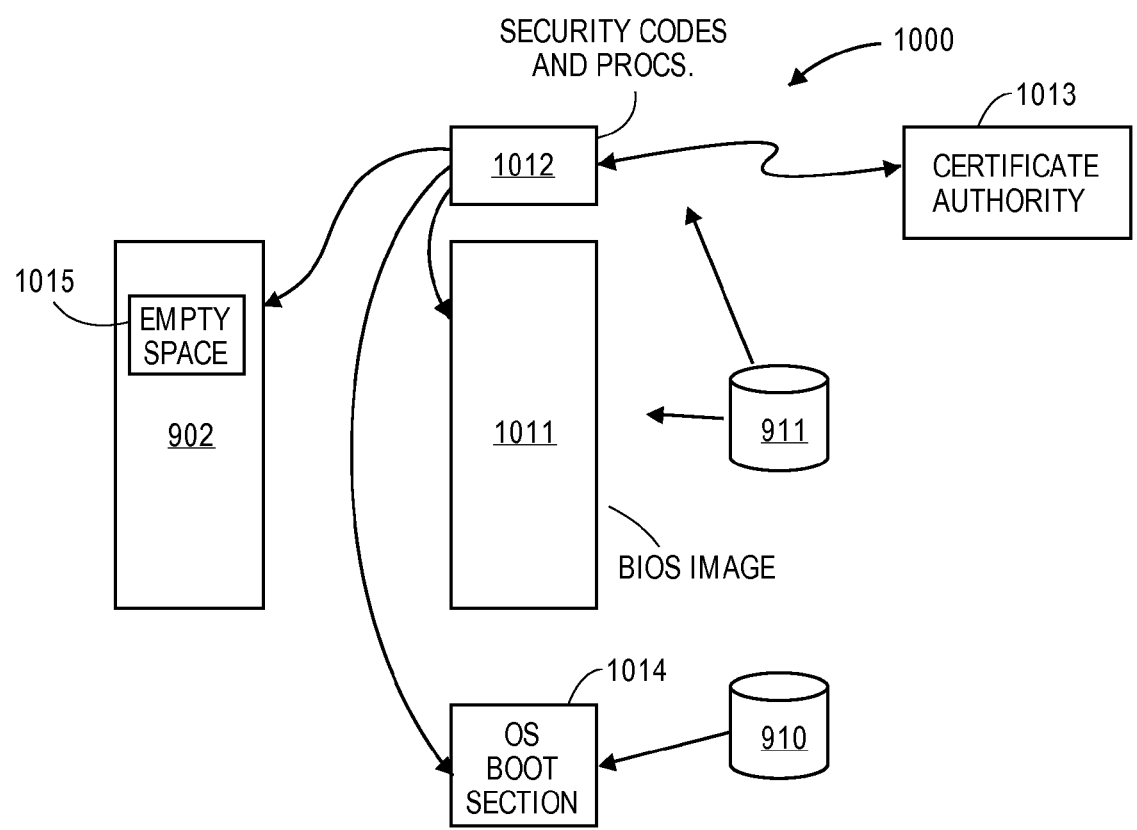
FIG. 10 is an illustration of a BIOS verification and activation process according to an embodiment of the invention.

FIG. 10 is an illustration of a BIOS verification and activation process 1000 according to an embodiment of the invention. In an embodiment, when locked file 911 is loaded, locked file 911 contains a security code and procedure 1012 to check a full image 1011 of the BIOS, and in some cases CMOS data and other data. A software procedure then compares the secure image and the original flash 902. This software procedure may also, in some embodiments, verify "empty space" section 1015 as discussed later. This verification may be accomplished, for example, by checking of a signature or pattern that is supposed to be present in empty space.

The OS boot section 1014 is then activated when the software procedure has verified all security codes. In some embodiments, a certificate authority 1013, located across a network, may assist the verification process.

Figure 11:
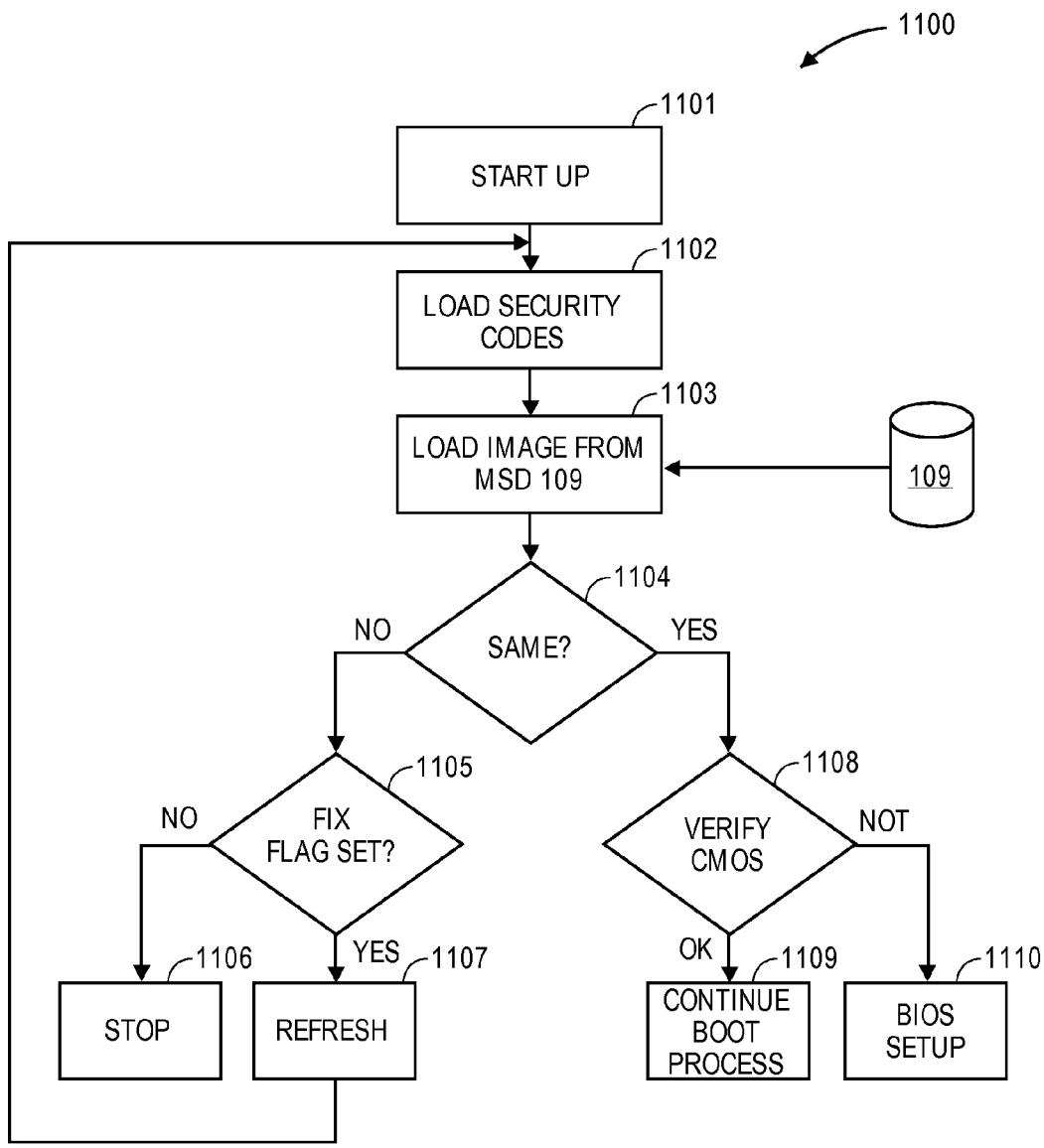
FIG. 11 is a flowchart of a pre-boot process according to an embodiment of the invention.

FIG. 11 is a flowchart of a pre-boot process 1100 according to an embodiment of the invention. In a hidden file, a full flash memory of the current BIOS may be kept, thus enabling recovery and return to a previous BIOS version when an upgrade to the is not successful. In addition to the actual BIOS, this file should contain is map of the CMOS information because the CMOS information may change its use or location from one version to the next. The map of the CMOS information should include not just the previous version of the CMOS mapping, but also indications of how to recalculate the original values. Again, this function can be enabled during pre-boot, or non-boot, or post-boot during OS operation before the actual re-flashing.

In step 1101, the system starts up.

In step 1102, the pre-boot process loads the security code.

In step 1103, an image are loaded from the mass storage device such as, for example, device 109.

In step 1104, the process branches. If the uploaded image (either a part of the BIOS or the entire BIOS) is the same (yes) as the content currently loaded in memory, or the content of the BOOT NVM (for example, ROM), the process continues to step 1108, where the CMOS is verified. If the CMOS verifies correctly (OK), then the process continues to step 1109, where the boot process continues.

If the CMOS is not verified (not) in step 1108, then the process may move to BIOS setup 1110. In BIOS setup 1110, the user is afforded an opportunity to correct problems. BIOS setup 1110 may also allow the BIOS to default to certain settings based on the preset (or most recent) configuration data from file 911.

If, in step 1104, a difference found between the uploaded images and the installed one image (no), then the process moves to step 1105, where in some cases a check is performed for the presence of an automatic fix flag.

If said flag is not set (no), then the process moves to step 1106, where it terminates. If the flag is set (yes), then in step 1107, a re-flash is performed and than the process loops back to step 1102.

Access keys and/or unique device identifiers (UDIDs) for individual machines can be stored in the BIOS. Programming such keys and/or UDIDs into the BIOS OTA provides an additional protection over keys stored on the hard drive as well as prevents the keys and/or UDIDs from being lost due to drive corruption or crash. The BIOS may be configured to generate those keys so the actual key values are not exposed. The use of the keys may also include, but is not limited to, secure access into a WLAN in the manufacturing area or into Wi-Fi hotspots of a carrier or unified access provider. Such keys may also he used for accessing toll-free usage of 3G, 4G, or similar WAN networks for of checking, and potentially downloading, new BIOS versions and the like.

Figure 12:
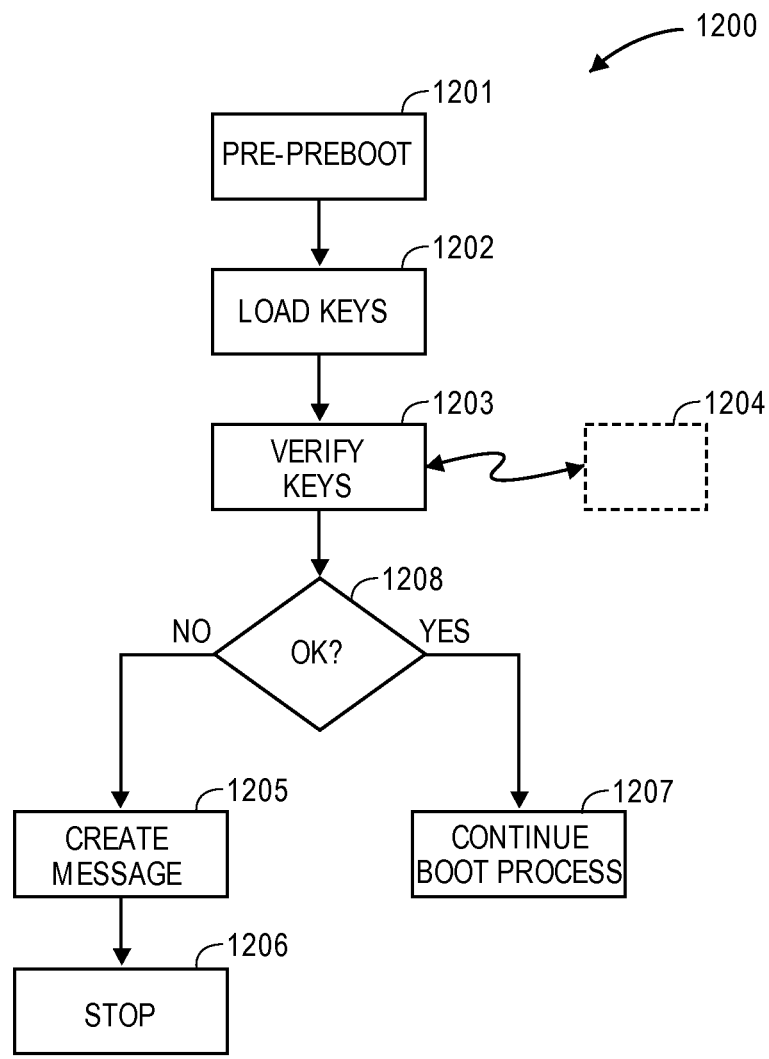
FIG. 12 is a flowchart of another pre-boot process according to an embodiment of the invention.

FIG. 12 is a flowchart of pre-boot process 1200 according to an embodiment of the invention. In step 1201, a "PPreboot" (pre-preboot) begins. In step 1202, security keys are loaded, and in step 1203 the keys are verified against vault 1204, which can be one or more of either a certificate authority (CA), a disk file, or from non-volatile memory.

In step 1208, a cheek is performed to verify the above-mentioned keys. If the keys are confirmed OK (yes), then the boot process continues to step 1207. On the other hand, if the keys are not confirmed (no in step 1208, then at step 1205, a message is created, and then the process stops at step 1206.

In some cases, networks may block certain accesses, so a conversion to HTTP or HTTPS protocols may be needed to avoid firewall and/or router interference. In some cases, a private DNS service may be operated also over HTTP or HTTPS to enable system to use a network for Internet access to reach the servers, even if that server's IP address is not listed in the local DNS service.

It is clear that many modifications and variations of the system and method disclosed herein may be made by one skilled in the art without departing from the spirit of the novel art of this disclosure. For example, BIOS for helping boot up a system may reside in a non-volatile memory and have the ability to execute certain programs before booting an operating system. Such programs are able to connect to a server maintaining a database relevant to versions of the BIOS. Further, in some cases the BIOS could download a newer version of BIOS code. The BIOS could then reprogram the non-volatile memory to use the newer code for the BIOS following the reprogramming.

Further, in an embodiment, a server may contain a program for automatic BIOS updates and a storage with at least one newer version of a BIOS. The server may respond to an inquiry issued by a system containing a BIOS. This interaction can be made without requiring an operating system to be present in the system. Additionally, the BIOS eco-system may contain code allowing the reprogramming to be made without requiring user interaction on the system or a reboot of the system. In some cases, the BIOS may contain code to connect over wireless communication when available to the server. Also, the BIOS may store the older version in a secure file in non-volatile memory to allow the user to revert to a previous version in cases where needed or desired.

Further modifications and variations of the system and method disclosed herein may include a system with a BIOS for helping boot up a system. This BIOS may reside in a non-volatile memory and may have the ability to execute certain programs before booting an operating system. These programs may be able to launch a pre-boot operating environment. In some cases, this pre-boot operating environment may be a Linux-style operating system where downloaded Linux C programs may be executed. Further, this pre-boot operating environment may allow "instant-on" for programs to he executed. In some cases, these programs may include IP telephony or media players, while in other cases, they may include graphics output protocols players. Additionally, in some cases, traditional BIOS boot messages may appear in a small window at the periphery of screen, allowing the majority to be used for these programs. In such cases, the user may indicate interest in an item and bookmark it for later use, including, for example, purchasing or licensing said item.

Other embodiments may include a BIOS that resides in a non-volatile memory. The BIOS may have the ability to compare the content of a file in memory or persistently stored to the boot memory to verify the accuracy of the content. This file may be used to revert to a previous BIOS and/or the may contain a map of he CMOS information. Also, a section of code may disallow third-party access to the BIOS boot memory. Such disallowance may include the use of keys or certificates, in some cases with the checksum and certificate comparisons occurring every time before boot. Further, a section of code may recognize compromised security by analyzing traces that such a compromise would create, and in some cases, the analysis may include the retrieval of a checksum stored in a secret location in memory or on the disk and comparing it to the actual checksum. This analysis may include retrieving a checksum stored on a server and comparing it to the actual checksum. In some cases, the system may employ an empty space signature for further security, which empty spaces are checked by the checksum. Additionally, hidden network access keys may be used to connect to a network pre-boot.

APPLICATION STORE FOR BIOS APPLICATIONS

Embodiments of the invention feature a BIOS that may be extended with applications that can execute during a pro-boot stage. In other embodiments, such applications may execute during or after the boot stage as well. These applications can be stored in the BIOS or in the hidden file that the BIOS can also access without booting the operating system. Embodiments of the invention may, as a result, operate an application store, or "app store" if you will, that can provide applications signed by the BIOS issuer as being approved for plug-in applications that can be used in conjunction with in a pre-boot or post-boot environment.

An application store of an embodiment may he used to add applications may support monetary transactions. Applications received through the application store may be disbursed for free or for a fee.

Payment systems which the application store may employ include without limitation credit cards; electronic payment systems such as PayPal, ACH., or other suitable current or future payment means. Credit card information or other purchasing credentials can be encrypted and stored in the BIOS. Stored credit card information may be accessed by an authenticated and authorized user. In some cases, keys as described above and throughout, can be used to identify and/or secure access for such transactions over any type of network needed.

Figure 13:
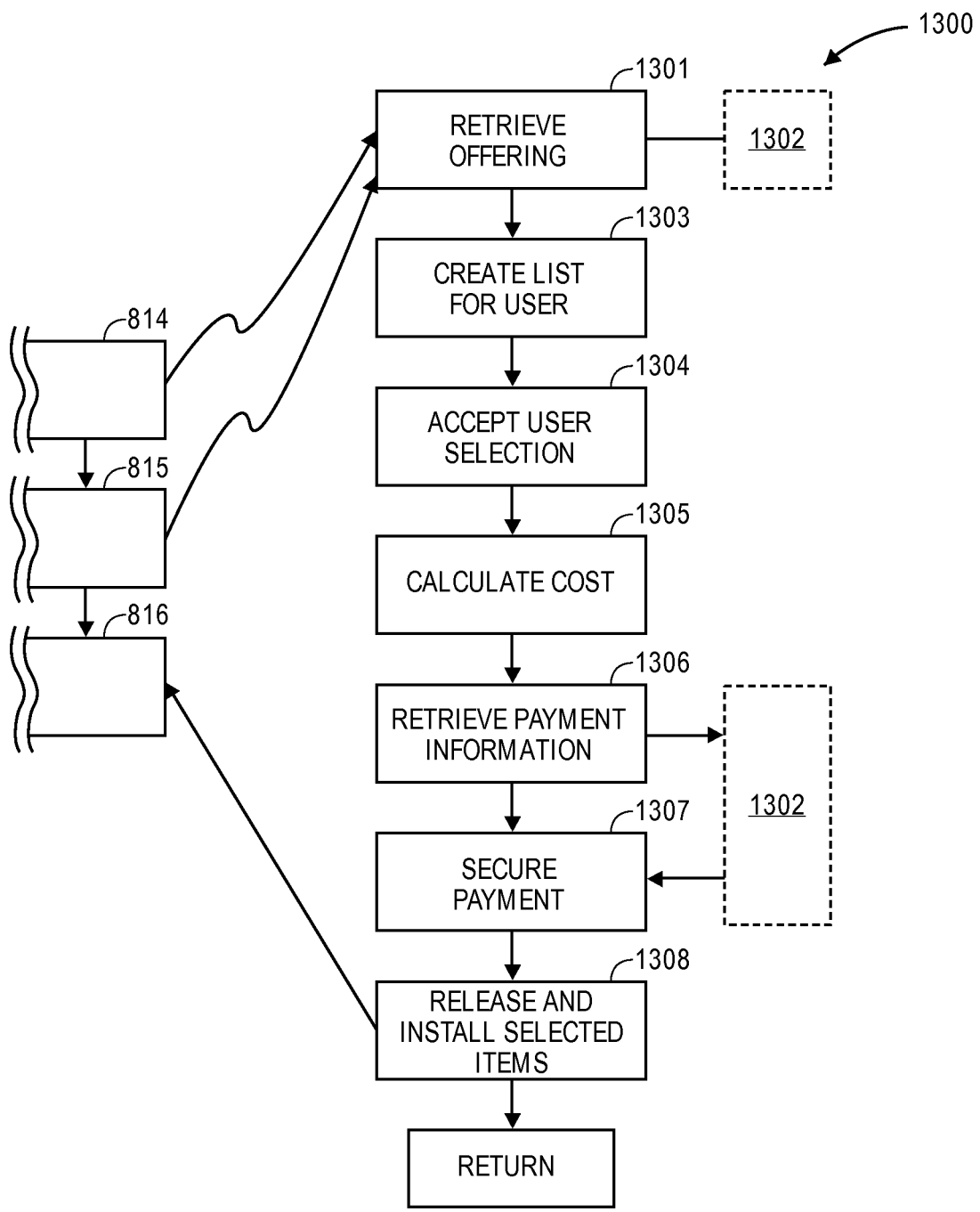
FIG. 13 is an illustration of a process for an E-Commerce store software according to an embodiment of the invention.

FIG. 13 is an illustration of a process 1300 for an E-Commerce store software According to an embodiment of the invention. During pre-boot steps 814 and 815 of FIG. 8, the user is able to activate E-Commerce store software by submitting input, such as pushing a certain physical button, a GUI button, or entering certain commands. Doing so starts step 1301 of FIG. 13. In step 1301, store software retrieves a store offering list. This list may be organized many different ways. The list may have multi-level menus. The list may be organized by brands, or by product types, or by any other means of differentiating products. In general, the list may be structured in a manner similar to product offerings currently available on TV. The latest available offering list may be retrieved from non-volatile storage device 1302, which may be any of various types of data storage devices, including, but not limited to, flash ROM, hard disk, flash disk, non-volatile memory, any other similar storage media, or even from a server over a network.

In step 1303, the store software creates a customized list based on the user's input when requesting the list.

In step 1304, the user makes selections from the list created in step 1303 (interaction steps not shown).

In step 1305, the store software calculates any costs associated with the selected products. In some cases, certain selections may be free, and in some other cases, obtaining certain items may require that the user set up an account to render payment.

In step 1306, the store software receives payment confirmation from user. The software store sends the transaction information to a payment clearing module 1302. Payment may be deducted from a prepaid account that is stored in non-volatile memory using certificate and encryption codes. In other embodiments, payment can be made via an interaction with a payment server. The payment server may interact with any type of electronic payment medium, including, but not limited to, credit cards, debit cards, prepaid cards, and automated clearing house (ACH).

In step 1307, the payment is tendered, if necessary.

In step 1308, the selected items are released to the system and installed or downloaded from the server, and the items are made available to the pre-boot environment 816, as described above in the discussion of FIG. 8. The process then ends, typically returning to the pre-boot environment main screen.

It is clear that many modifications and variations of the system and method disclosed herein may be made by one skilled in the art without departing from the spirit of the novel art of this disclosure.

PRE-BOOT MANAGEMENT OF DRIVERS AND PROGRAMS

Regarding the connectivity in a pre-boot environment, in situations where no Wi-Fi is available, the BIOS (or pre-boot environment, both used interchangeably herein) may look for 3G and 4G modems and other, similar network, particularly using earlier modems that conform to certain standards in modem response. The BIOS could use such modems to connect to the Internet. In some cases, it may be desirable to ask the user for permission to connect, because some such modem connections may incur charges. This ability could be used in cases where the system cannot get access to the Internet during operation in using Wi-Fi.

Figure 14:
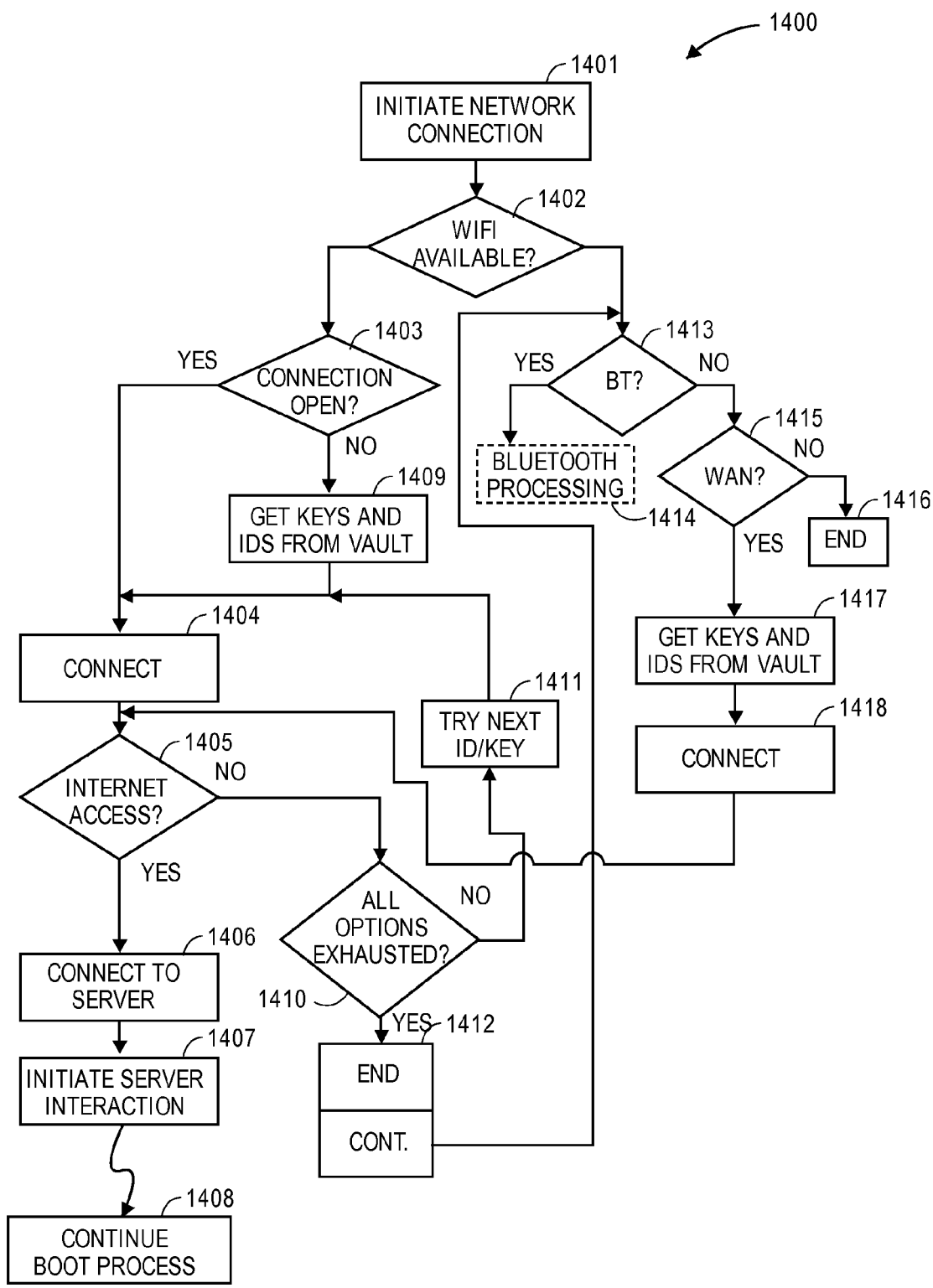
FIG. 14 shows an exemplary process for implementation of pre-boot connectivity according to an embodiment of the invention.

FIG. 14 shows an exemplary process 1400 for implementation of pre-boot connectivity according to an embodiment of the invention. As mentioned previously, in various cases pre-boot connectivity not by means of Wi-Fi or LAN, but instead by 3 G or 4G or other suitable network as available, may be necessary or desirable. At step 1401, the process is launched when it is necessary for a system to connect to a server, for example, to replace corrupted drivers, or to make other upgrades. At stop 1402, a check is made to determine if a Wi-Fi network is available. If a Wi-Fi network is available (yes), at step 1403 a check is made to determine if the Wi-Fi connection is open. If the connection is open (yes), at step 1404, where connection to the Wi-Fi network is made. At step 1405, a check is made to determine whether Internet access is possible. If Internet access is possible (yes), at step 1406, a connection to a server is made. At step 1407 whatever interaction is needed with the server begins, and the interaction continues as appropriate in step 1408. If, at step 1405, Internet access is not possible (no), at step 1410, a check is made to determine if all connectivity options have been exhausted. If so (yes), at step 1412 the process either ends or continues in a different direction. If, at step 1410, all connectivity options have not been exhausted (no), the process loops back to try a different approach, such as, for example, trying a different ID or key, as shown at step 1411. If, at step 1403, the Wi-Fi network is not open (no), keys and IDs are retrieved from the data vault, (described earlier and throughout) at step 1409. The process then loops back to step 1404 to try again to connect, using said retrieved keys and IDs. If, at step 1402, a Wi-Fi network is not available (no), at step 1413 a check is made to determine whether Bluetooth is present. If Bluetooth is present (yes), at section 1414 checks and steps are made analogous to those described above, starting at step 1403. If Bluetooth is not present (no), at step 1415 a check is made to determine if a WAN is present. If no WAN is present (no), at step 1416 the process ends. If, at step 1415, a WAN is present (yes), at step 1417, at step 1417 keys and IDs for the WAN are retrieved, in a manner similar to the retrieval performed at step 1409, although the keys and IDs themselves may be different. At step 1418 an attempt to connect is made, using said retrieved keys and IDs, and upon connection the process loops back to step 1405 and continues from there, as described above. Since some Wi-Fi networks and 3G/4G networks charge the user based on use (usually in time increments) for connectivity, in some cases, the user may be prompted for permission to access a network. Also, in some cases, the system may connect to a toll-free service to be provided by the system manufactuer at no extra charge to the user.

Figure 15:
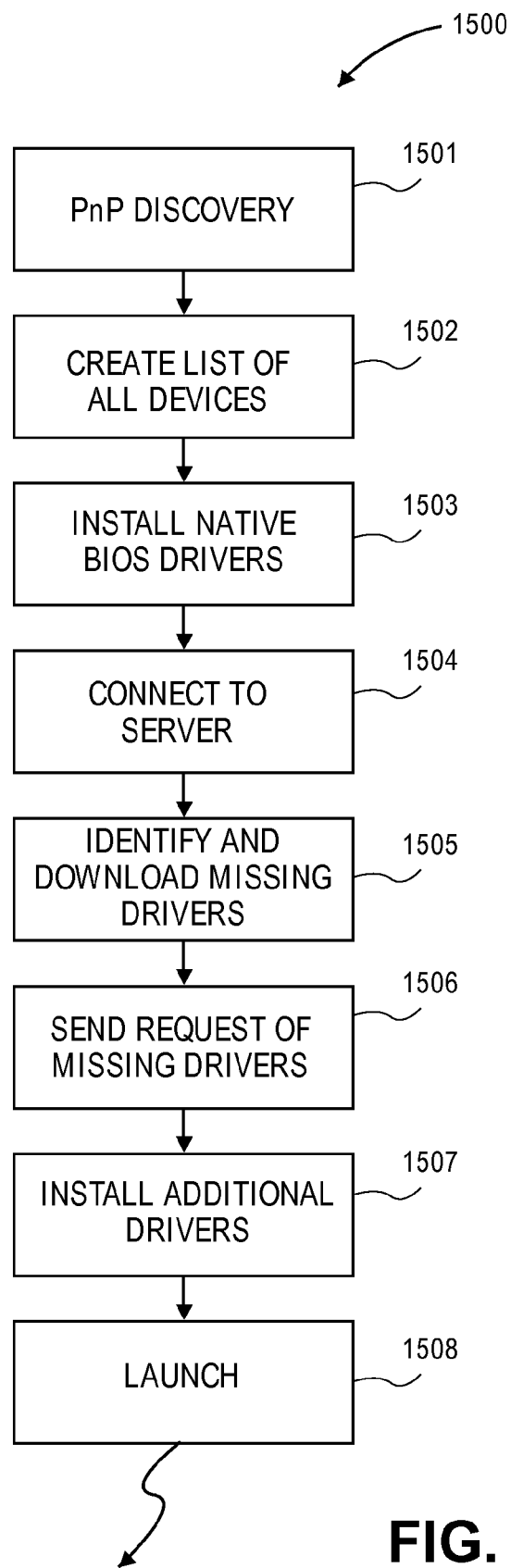
FIG. 15 shows an exemplary process flow for management of pre-boot discovery according to an embodiment of the invention.

FIG. 15 shows an exemplary process flow 1500 for management of pre-boot discovery according to an embodiment of the invention. In step 1501, the pre-boot system executes a standard Plug 'n' Play discovery. In step 1502, the system creates a list of all detected devices. In step 1503, native BIOS drivers are installed for standard devices and for devices that are present. Typically, that covers such devices as basic hard disk, CD ROM, floppy disk, sometimes USB drives or other removable media, keyboard, and a basic version of a display. However, enhanced displays or drive arrays often don't work correctly in this environment, because their drivers are not available or not installed. In step 1504, the system uses methods described previously and throughout to connect to the server. It then, in step 1505, identifies and downloads the missing drivers by requesting specific drivers from the server. In some cases, the system may rely on the material requirements planning (MRP) system tables or databases, etc. created (description below and herein); in other cases, the system may do true self-discovery, using the vendor ID and product ID (VID/PID) of the devices to identify them as best it can. In additional cases, the device may have identity information in a boot ROM, which information the system may use to further identify the device. In step 1506, for drivers it cannot find, the system sends a request to the server to record them in a list of additional drivers needed. This list is a kind of "wish list" kept at the server that may be used to further complete the data base of available drivers. In some cases, the system may also look on the Internet for additional sources of drivers, such as, for example, a manufacturer's web site, as shown in step 1506. In some cases, the system may take this step directly; in other cases, the server may act as intermediary for the system in seeking drivers from external sources. In step 1507, the additional drivers are downloaded and installed into the OS environment if necessary. In step 1508, the OS is launched.

Figure 16:
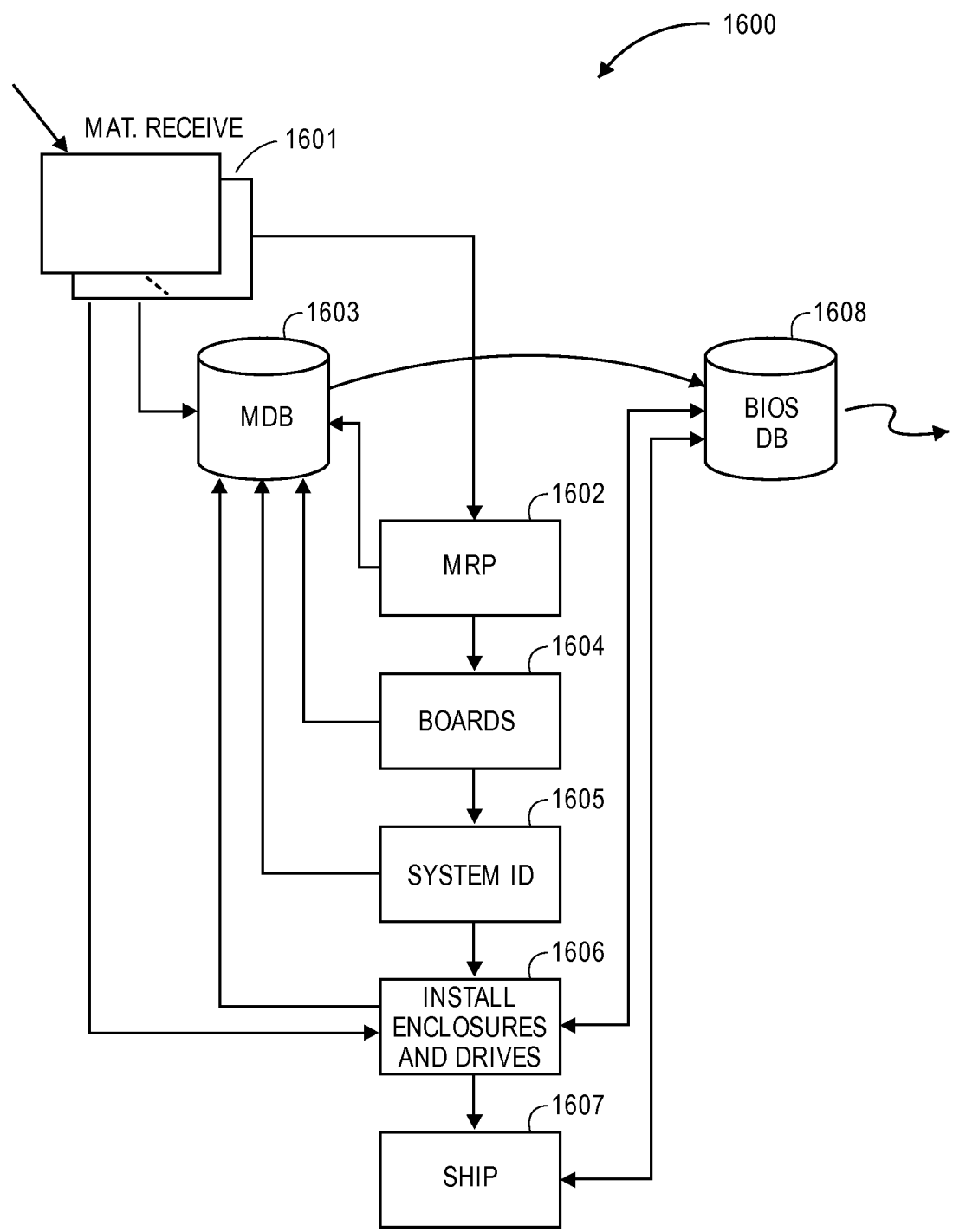
FIG. 16 shows an overview of an MRP-based tracking system according to an embodiment of the invention.

FIG. 16 shows an overview of an MRP-based tracking system 1600 according to an embodiment of the invention. Use of such a system during manufacturing enables tracking all the devices, including but not limited to all the chip sets, put into a computer or similar system, including all the device drivers and other, similar programs. Sometimes a chip goes through several revisions, and the different revisions require correspondingly different drivers. Unfortunately, chip and/or device manufacturers don't always update the VID/PID when they update the product, for cost reasons, human error, or other reasons; therefore, unless the chip and/or device updates are tracked from the beginning, it is very difficult, if not impossible, to know the correct version. Thus, if the reception date and manufacturing lot ID is tracked during manufacturing for all the devices received, a much more accurate and detailed data base may be created, containing the correct versions of specific chips on speak system boards, enhancing the chance of installing correct drivers.

In step 1601, materials are received at a factory in lot sizes for production. At various stages during reception and production, information is entered in manufacturing data base MDB 1603, which interacts with the MRP system 1602. At step 1604, boards are assembled, with all the ID and revision information about chips put on the boards being tracked. In step 1605, each board is given a system ID, which is now linked to a specific table containing not just a generic bill of materials, but the specific ID, with version and manufacturing lot, of any major component on the board. In step 1606 the enclosure and drives are installed, as well as any necessary drivers. At this point, for drives such as CD ROM, DVD ROM, flash media, hard drives, etc., that all contain firmware, all the details are noted, such as the manufacturing lot, the firmware version with which each device was initially delivered, etc. These records are kept because in some cases, OS changes may require updates of device firmware as well. In step 1607, some updates may occur before shipping, which updates are also recorded. All this information is then transferred into BIOS database 1608, which is made available to the server described previously and throughout for later system updates OTA or any other suitable way.

Figure 17:
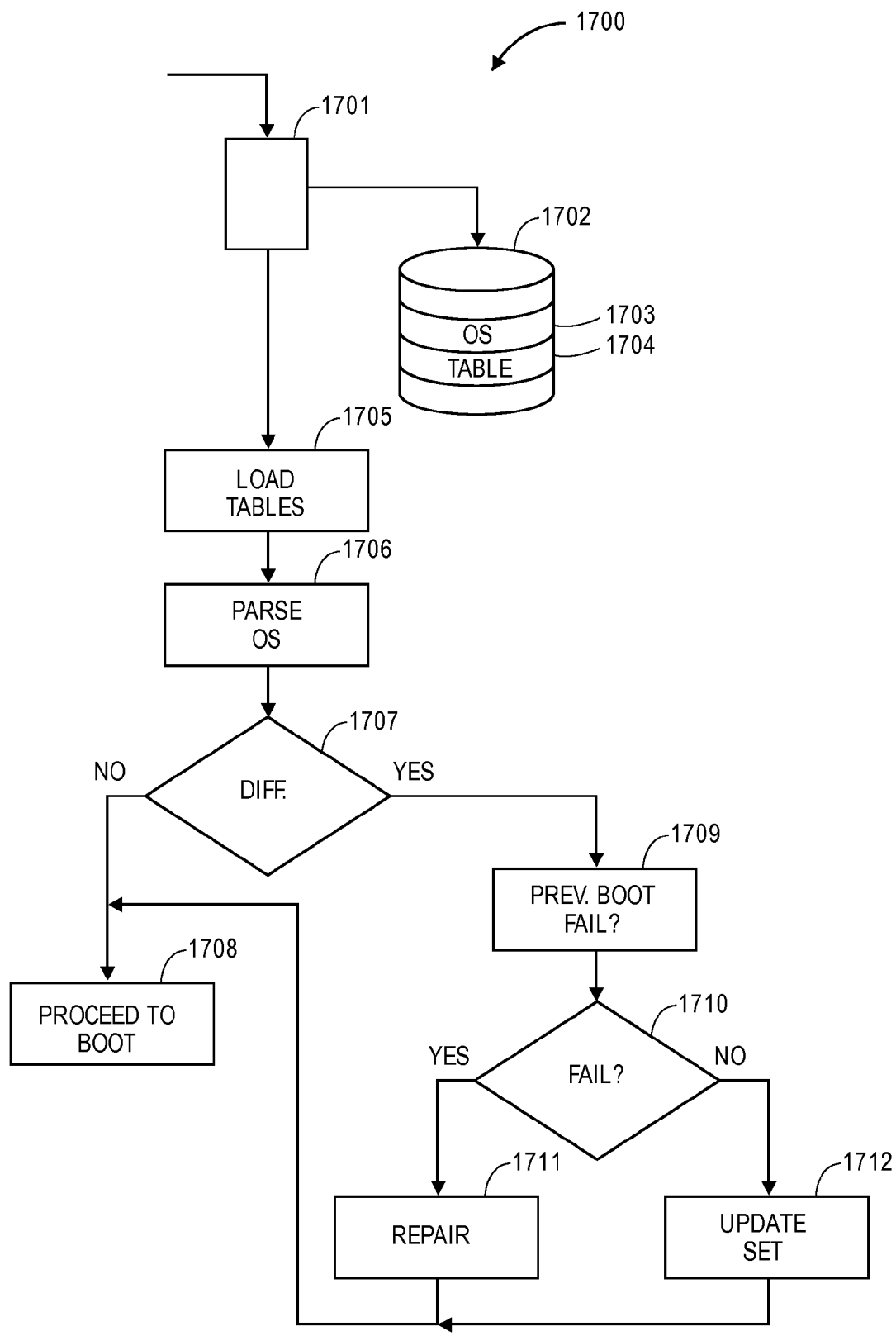
FIG. 17 shows an overview of an exemplary pre-boot OS table scan according to an embodiment of the invention.

FIG. 17 shows an overview or an exemplary pre-boot OS table scan 1700 according to an embodiment of the invention. In step 1701 the scan accesses the mass storage device 1702, which device has an OS partition 1703 and a table 1704 listing the correct drivers as they should he loaded. In step 1705, the tables are loaded and compared to the currently installed drivers. In step 1706, the OS is parsed. If, at step 1707, the scan finds that the currently installed drivers and the lists in the tables are Different (yes), in step 1709 scan checks to determine whether the previous boot attempts failed. If the previous attempts have failed (yes), the scan continues to step 1711 where the tables are used to repair drivers, if necessary by connecting to the server and downloading correct versions of the damaged or missing drivers. If, at step 1710, no boot failures were detected (no), at step 1712 it is assumed that the difference detected at step 1707 is due to an update executed through the OS, and the tables are updated accordingly. In some cases, two or three revisions both of drivers and of tables may be needed to return the pre-boot environment to a previous state. This ability to return to a previous state is important because if, far example, an updated driver doesn't work, the system may never he able to actually boot. In all cases, the final step in the process is an OS boot at step 1708.

It is clear that many modifications and variations of the system and method disclosed herein may be made by one skilled in the art without departing from the spirit of the novel art of this disclosure. For example, BIOS for helping boot up a system may reside in a non-volatile memory, which BIOS has the ability to execute certain programs before booting an operating system, and these programs are able to connect to a server maintaining a database relevant to versions of the BIOS. Further, in some cases the BIOS could download a newer version of BIOS code, and the BIOS could then reprogram the non-volatile memory to use the newer code for the BIOS following the reprogramming. Further, a server may contain a program for automatic BIOS updates and a storage with at least one newer version of a BIOS, with the server responsive to inquiry by a system containing a BIOS, wherein such an interaction can be made without requiring an operating system present in the system. Additionally, the BIOS eco-system may contain code allowing the reprogramming to be made without requiring user interaction on the system or a reboot of the system. In some cases, the BIOS may contain code to connect over wireless communication when available, and thus connect to the server. Also, the BIOS may store the older version in a secure file in non-volatile memory, allowing the user to revert to a previous version in cases where needed or desired.

Further modifications and variations of the system and method disclosed herein may include a system with a BIOS for helping boot up a system, which BIOS may reside in at non-volatile memory, and which BIOS may have the ability to execute certain programs before booting an operating system, and these programs may be able to launch a pre-boot operating environment. In some cases, this pre-boot operating environment may be a Linux-style operating system, wherein downloaded Linux C programs may be executed. Further, this pre-boot operating environment may allow "instant-on" for programs to be executed. In some cases, these programs may include IP telephony or media players, while in other eases, they may include graphics output protocols players. Additionally, in some cases, traditional BIOS boot messages may appear in small window at the periphery of screen, allowing the majority to be used for these programs. In such cases, the user may indicate interest in an item and bookmark it for later use, including, for example, purchasing or licensing said item.

Additional modifications and variations of the system and method disclosed herein may include a system with a BIOS for helping boot up a system, which BIOS may reside in a non-volatile memory, and which BIOS has the ability to compare the content of a file memory or on a hard drive or other suitable MSD to the boot memory, focusing, specifically on the accuracy of the content. This file may be used to revert to a previous BIOS, and/or it may contain a map of the CMOS information. Also, a selection of code may disallow third-party access to the BIOS boot memory. Such disallowance may include the use of keys or certificates, in some cases with the checksum and certificate comparisons occurring every time before boot. Further, a section of code may recognize compromised security by analyzing traces that such a compromise would, create, and in some cases, the analysis may include the retrieval of a checksum stored in a secret location in memory or on the disk and comparing it to the actual checksum. This analysis may also include retrieving a checksum stored on a server and comparing it to the actual checksum. In some cases, the system may employ an empty space signature for further security, which empty spaces are checked by the checksum. Additionally, hidden network access keys may be used to connect to a network pre-boot.

Additionally, the BIOS may be extended with B-Commerce applications that can, for example, run during the pre-boot stage. These applications may be stored in the BIOS or in the hidden file that the BIOS can also access without booting the OS. Such a feature represents a kind of "app store" that can provide applications signed by the BIOS issuer as approved for plug-in applications that can be used in conjunction with a pre-boot or post-boot environment.

Furthermore, this app store could be provided to add applications (described above) that could also effect monetary transactions, so applications could be disbursed free or could require payment. Payment systems may include means such as credit cards; electronic payment systems such as PayPal, ACH, etc., or other suitable current or future payment means. Credit card information or other purchasing credentials can be encrypted and stored in the BIOS, to be accessed by an authenticated and authorized user.

In some cases, a system may have a BIOS for helping boot up a system, which BIOS resides in non-volatile memory and can be extended with applications that can, for example, run during the pre-boot stage. These applications can be acquired from an online store, which may be visited during pre-boot. This store may have free applications for flashing to BIOS, and the store may also collect payment for applications flashed to BIOS. Payment collection means may use any suitable existing online payment system. Also, purchasing credentials required by an online payment system can be encrypted and stored in the BIOS, to be accessed by an authenticated and authorized user. Such purchased applications may be stored in the BIOS or in the hidden file that the BIOS can also access without booting the OS. This application store can provide applications signed by a previously approved issuer. Further, an application can be approved as a plug-in application that can be used in conjunction with a pre-boot or post-boot environment.

In some cases, a system may have a BIOS for helping boot up a system, which BIOS resides in non-volatile memory and has the ability to utilize carrier network modems to connect to a server to check for updates. These modems may include 3 G and 4 G modems and other, similar network carrier modems that conform to certain standards in modern response. The BIOS, moreover, may, in some cases, ask the user for permission to connect to a network, or, alternatively, may ask for permission only in cases where such modem connections may incur charges. Furthermore, such connections may only be made after exhausting other connection methods, at least one of which may be Wi-Fi, Bluetooth or wired LAN connections. This ability could be used in cases where the system cannot get access to the internet during operation or using Wi-Fi.

In some cases, a system may have a BIOS using discovery for setting up device drivers by discovering devices in the system and loading drivers, this discovery further enhanced by connecting to a server that contains additional information about drivers in the form of lists, such as, for example OS drivers, and also about OS configuration. The BIOS, based on information from the server, may repair or fix problems that may stop the OS from booting. The BIOS may also have enhanced abilities to discover peripherals and other devices in the system not supported in normal pre-boot plug and play, as well as networking devices, etc. The BIOS may also be responsive to remote access, so an OEM or third party service providers can maintain individual machines. Further, list on the server is created by lot tracking during manufacturing.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable medium storing one or more sequences of instructions, which when executed, cause:
   a BIOS, operating in a pre-boot environment, establishing a connection to a remote server; and
   the BIOS determining whether the server has any updates to be performed to the BIOS using the connection,
   wherein the BIOS is configured to establish the connection only after receiving permission from a user if said connection incurs a financial charge.

2. The non-transitory computer-readable medium of claim 1, wherein the connection is established using a carrier network modem.

3. The non-transitory computer-readable medium of claim 2, wherein the carrier network modem is a 3 G or a 4 G modem.

4. The non-transitory computer-readable medium of claim 1, wherein the BIOS is configured to try all connection options that do not incur a financial charge before using a connection option that incurs a financial charge.

5. The non-transitory computer-readable medium of claim 4, wherein the connection options include Wi-Fi, Bluetooth, and wired LAN connections.

6. A non-transitory computer-readable medium storing one or more sequences of instructions, which when executed, cause:
   a BIOS performing a discovery process to discover devices operationally connecting to the BIOS and load drivers associated therewith;
   the BIOS, operating in a pre-boot environment, establishing a connection to a remote server that stores information for installing the drivers;
   the BIOS maintain a repository of network credentials; and
   the BIOS using a set of network credentials, from the repository, to connect over a wireless network to the remote server in the discovery process.

7. The non-transitory computer-readable medium of claim 6, wherein the information comprises information about OS drivers.

8. The non-transitory computer-readable medium of claim 6, wherein the information comprises information about BIOS enhancements.

9. The non-transitory computer-readable medium of claim 6, wherein the information comprises information about configuration of an operating system.

10. The non-transitory computer-readable medium of claim 6, wherein the information is employed by the BIOS to repair problems that prevent an operation system from booting.

11. The non-transitory computer-readable medium of claim 6, wherein the information is employed by the BIOS to repair operational problems of the BIOS.

12. The non-transitory computer-readable medium of claim 6, wherein execution of the one or more sequences of instructions further cause:
   the BIOS, operating in the pre-boot environment, receiving a communication from a OEM or third party service provider over a network.

13. The non-transitory computer-readable medium of claim 6, wherein the discovery process provides, to a network device over a network, access to data stored on a device upon which the BIOS executes.

14. The non-transitory computer-readable medium of claim 13, wherein said data includes one or more of picture files, music files, video files, documents, emails, and other media files or objects stored on said device.

15. The non-transitory computer-readable medium of claim 13, wherein said device is a phone, a personal digital assistance (PDA), a tablet PC, or a laptop computer.

16. An apparatus, comprising:
   one or more processors; and
   one or more non-transitory computer-readable mediums storing one or more sequences of instructions, which when executed by the one or more processors, cause:
      a BIOS, operating in a pre-boot environment, establishing a connection to a remote server; and
      the BIOS determining whether the server has any updates to be performed to the BIOS using the connection,
      wherein the BIOS is configured to establish the connection only after receiving permission from a user if said connection incurs a financial charge.

17. The apparatus of claim 16, wherein the connection is established using a carrier network modem.

18. The apparatus of claim 17, wherein the carrier network modem is a 3 G or a 4 G modem.

19. The apparatus of claim 16, wherein the BIOS is configured to try all connection options that do not incur a financial charge before using a connection option that incurs a financial charge.

20. The apparatus of claim 19, wherein the connection options include Wi-Fi, Bluetooth, and wired LAN connections.

21. An apparatus, comprising:
   one or more processors; and
   one or more non-transitory computer-readable mediums storing one or more sequences of instructions, which when executed by the one or more processors, cause:
      a BIOS performing a discovery process to discover devices operationally connecting to the BIOS and load drivers associated therewith;
      the BIOS, operating in a pre-boot environment, establishing a connection to a remote server that stores information for installing the drivers;
      the BIOS maintain a repository of network credentials; and
      the BIOS using a set of network credentials, from the repository, to connect over a wireless network to the remote server in the discovery process.

22. The apparatus of claim 21, wherein the information comprises information about OS drivers.

23. The apparatus of claim 21, wherein the information comprises information about BIOS enhancements.

24. The apparatus of claim 21, wherein the information comprises information about configuration of an operating system.

25. The apparatus of claim 21, wherein the information is employed by the BIOS to repair problems that prevent an operation system from booting.

26. The apparatus of claim 21, wherein the information is employed by the BIOS to repair operational problems of the BIOS.

27. The apparatus of claim 21, wherein execution of the one or more sequences of instructions further cause:

the BIOS, operating in the pre-boot environment, receiving a communication from a OEM or third party service provider over a network.

28. The apparatus of claim 21, wherein the discovery process provides, to a network device over a network, access to data stored on a device upon which the BIOS executes.

29. The apparatus of claim 28, wherein said data includes one or more of picture files, music files, video files, documents, emails, and other media files or objects stored on said device.

30. The apparatus of claim 28, wherein said device is a phone, a personal digital assistance (PDA), a tablet PC, or a laptop computer.

\* \* \* \* \*